(12) United States Patent
Twitchell, Jr.

(10) Patent No.: US 8,447,882 B2
(45) Date of Patent: *May 21, 2013

(54) SOFTWARE ROUTER FACILITATING NETWORK COMMUNICATIONS BETWEEN DEVICES UTILIZING VIRTUAL NETWORK CONNECTIONS

(75) Inventor: Robert W. Twitchell, Jr., Cumming, GA (US)

(73) Assignee: Dispersive Networks Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,325

(22) Filed: Sep. 23, 2011

(65) Prior Publication Data

US 2012/0017008 A1   Jan. 19, 2012

Related U.S. Application Data

(63) Continuation of application No. 12/499,075, filed on Jul. 7, 2009, which is a continuation-in-part of application No. 12/253,926, filed on Oct. 17, 2008, now Pat. No. 7,895,348.

(60) Provisional application No. 60/999,603, filed on Oct. 17, 2007, provisional application No. 61/133,935, filed on Jul. 7, 2008.

(51) Int. Cl.
*G06F 15/173* (2006.01)
(52) U.S. Cl.
USPC ............ 709/238; 709/203; 709/219; 709/250
(58) Field of Classification Search
USPC ......................................................... 709/238
See application file for complete search history.

(56) References Cited

U.S. PATENT DOCUMENTS

| | | |
|---|---|---|
| 5,274,762 A | 12/1993 | Peterson et al. |
| 5,537,417 A | 7/1996 | Sharma et al. |

(Continued)

FOREIGN PATENT DOCUMENTS

| | | |
|---|---|---|
| EP | 1089506 A2 | 4/2001 |
| EP | 1791300 A1 | 9/2007 |

(Continued)

OTHER PUBLICATIONS

Information Disclosure Statement (IDS) Letter Regarding Common Patent Application(s), dated Sep. 30, 2011.

(Continued)

*Primary Examiner* — Christopher Biagini
(74) *Attorney, Agent, or Firm* — Tillman Wright, PLLC; Chad D. Tillman; Jeremy C. Doerre

(57) ABSTRACT

A method includes communicating, by a first device, a request to a server to engage in communications with a second device; communicating, by the server, the request received from the first device to the second device; communicating, by the second device, acceptance to the server; communicating information associated with a third device to the first device; using a virtual network connection of the first device, establishing network communications with the third device; communicating information associated with the third device to the second device; using a virtual network connection of the second device, establishing network communications with the third device, wherein the third device is configured to act as a switch and provide cross-connect functionality between the first virtual network connection of the first device and the second virtual network connection of the second device.

19 Claims, 15 Drawing Sheets

U.S. PATENT DOCUMENTS

| | | | |
|---|---|---|---|
| 5,598,532 A | 1/1997 | Liron | |
| 5,761,195 A | 6/1998 | Lu | |
| 6,011,792 A | 1/2000 | Miloslavsky | |
| 6,061,349 A | 5/2000 | Coile et al. | |
| 6,104,801 A | 8/2000 | Miloslavsky | |
| 6,704,803 B2 | 3/2004 | Wilson et al. | |
| 6,742,023 B1 | 5/2004 | Fanning et al. | |
| 6,922,774 B2 | 7/2005 | Meushaw et al. | |
| 7,254,114 B1 | 8/2007 | Turner et al. | |
| 7,270,193 B2 | 9/2007 | Hashimoto et al. | |
| 7,281,247 B2 | 10/2007 | Lodwick et al. | |
| 7,319,700 B1 | 1/2008 | Kompelia | |
| 7,350,071 B1 | 3/2008 | Reisman | |
| 7,441,270 B1 * | 10/2008 | Edwards et al. | 726/15 |
| 7,584,285 B2 | 9/2009 | Hudson et al. | |
| 7,620,955 B1 * | 11/2009 | Nelson | 719/312 |
| 7,630,368 B2 | 12/2009 | Tripathi et al. | |
| 7,693,064 B2 | 4/2010 | Thubert et al. | |
| 7,720,672 B1 | 5/2010 | Buswell et al. | |
| 7,756,027 B1 * | 7/2010 | Reddy et al. | 370/230 |
| 7,765,307 B1 | 7/2010 | Kritov et al. | |
| 7,788,713 B2 | 8/2010 | Grobman et al. | |
| 7,895,348 B2 | 2/2011 | Twitchell | |
| 8,341,291 B2 | 12/2012 | Twitchell, Jr. | |
| 8,341,292 B2 | 12/2012 | Twitchell, Jr. | |
| 8,352,636 B2 | 1/2013 | Twitchell, Jr. | |
| 2002/0019831 A1 | 2/2002 | Wade | |
| 2002/0072939 A1 * | 6/2002 | Kawaberi | 705/5 |
| 2002/0107890 A1 | 8/2002 | Gao et al. | |
| 2002/0119821 A1 | 8/2002 | Sen et al. | |
| 2002/0132209 A1 | 9/2002 | Grant et al. | |
| 2002/0136209 A1 | 9/2002 | Shtivelman | |
| 2003/0008712 A1 | 1/2003 | Poulin | |
| 2003/0069957 A1 | 4/2003 | Malmskog et al. | |
| 2003/0088610 A1 | 5/2003 | Kohn et al. | |
| 2003/0110288 A1 | 6/2003 | Ramanujan et al. | |
| 2003/0123419 A1 | 7/2003 | Rangnekar et al. | |
| 2003/0137974 A1 | 7/2003 | Kwan et al. | |
| 2003/0202008 A1 | 10/2003 | McDonald et al. | |
| 2004/0054650 A1 | 3/2004 | Chun | |
| 2004/0076277 A1 | 4/2004 | Kuusinen et al. | |
| 2004/0128670 A1 | 7/2004 | Robinson et al. | |
| 2004/0205777 A1 | 10/2004 | Zalenski et al. | |
| 2004/0230660 A1 * | 11/2004 | Abjanic et al. | 709/207 |
| 2004/0240440 A1 * | 12/2004 | Wild et al. | 370/389 |
| 2004/0252661 A1 | 12/2004 | Lintulampi et al. | |
| 2004/0252674 A1 | 12/2004 | Soininen et al. | |
| 2004/0255161 A1 | 12/2004 | Cavanaugh | |
| 2005/0004968 A1 * | 1/2005 | Mononen et al. | 709/200 |
| 2005/0015511 A1 | 1/2005 | Izmailov et al. | |
| 2005/0100002 A1 | 5/2005 | Oouchi et al. | |
| 2005/0132362 A1 | 6/2005 | Knauerhase et al. | |
| 2005/0222858 A1 | 10/2005 | Okada | |
| 2006/0029064 A1 | 2/2006 | Rao et al. | |
| 2006/0050719 A1 | 3/2006 | Barr et al. | |
| 2006/0085855 A1 | 4/2006 | Shin et al. | |
| 2006/0182108 A1 | 8/2006 | Krumel | |
| 2006/0224920 A1 | 10/2006 | Rooholamini et al. | |
| 2006/0253532 A1 | 11/2006 | Kukoleca | |
| 2007/0060363 A1 | 3/2007 | Nguyen et al. | |
| 2007/0110048 A1 * | 5/2007 | Voit et al. | 370/389 |
| 2007/0179955 A1 | 8/2007 | Croft et al. | |
| 2007/0192862 A1 | 8/2007 | Vermeulen et al. | |
| 2008/0002663 A1 | 1/2008 | Tripathi et al. | |
| 2008/0075084 A1 | 3/2008 | Choi et al. | |
| 2008/0090628 A1 | 4/2008 | Mueller et al. | |
| 2008/0271015 A1 * | 10/2008 | Ibrahim | 718/1 |
| 2009/0077254 A1 | 3/2009 | Darcie et al. | |
| 2009/0100128 A1 | 4/2009 | Czechowski et al. | |
| 2009/0106439 A1 | 4/2009 | Twitchell | |
| 2009/0327392 A1 | 12/2009 | Tripathi et al. | |
| 2010/0009758 A1 | 1/2010 | Twitchell | |
| 2011/0179136 A1 | 7/2011 | Twitchell | |
| 2012/0014389 A1 | 1/2012 | Twitchell | |
| 2012/0016955 A1 | 1/2012 | Twitchell, Jr. | |
| 2012/0016956 A1 | 1/2012 | Twitchell | |
| 2012/0016984 A1 | 1/2012 | Twitchell, Jr. | |
| 2012/0017005 A1 | 1/2012 | Twitchell, Jr. | |
| 2012/0017006 A1 | 1/2012 | Twitchell | |
| 2012/0017212 A1 | 1/2012 | Twitchell | |
| 2012/0017265 A1 | 1/2012 | Twitchell, Jr. | |
| 2012/0020352 A1 | 1/2012 | Twitchell | |
| 2012/0020353 A1 | 1/2012 | Twitchell | |
| 2012/0023202 A1 | 1/2012 | Twitchell, Jr. | |
| 2012/0023244 A1 | 1/2012 | Twitchell, Jr. | |
| 2012/0023258 A1 | 1/2012 | Twitchell | |
| 2012/0026889 A1 | 2/2012 | Twitchell, Jr. | |
| 2012/0030362 A1 | 2/2012 | Twitchell, Jr. | |
| 2012/0166653 A1 | 6/2012 | Twitchell | |
| 2012/0272315 A1 | 10/2012 | Twitchell | |

FOREIGN PATENT DOCUMENTS

| | | |
|---|---|---|
| WO | 2006058544 | 6/2006 |
| WO | 2009052452 | 4/2009 |

OTHER PUBLICATIONS

"International Search Report" and "Written Opinion of the International Search Authority" (Korean Intellectual Property Office) in Dispersive Networks Inc. et al, International Patent Application Serial No. PCT/US2008/080397, dated May 21, 2009, 12 pages.

Information Disclosure Statement (IDS) Letter Regarding Common Patent Application(s), dated Mar. 1, 2012.

Ford, Bryan, Srisuresh, Pyda, and Kegel, Dan, "Peer-To-Peer Communication Across Network Address Translators", Feb. 17, 2005, 13 pages. http://www.brynosaurus.com/pub/net/p2pnat/ accessed Jan. 13, 2012.

Information Disclosure Statement (IDS) Letter Regarding Common Patent Application(s), dated Feb. 1, 2013.

Maier, S.; Grau, A.; Weinschrott, H.; Rothermel, K.; "Scalable Network Emulation: A Comparison of Virtual Routing and Virtual Machines," Computers and Communications, 2007. ISCC 2007. 12th IEEE Symposium on , vol., No., pp. 395-402, Jul. 1-4, 2007.

Agrawal, A.; Ganguly, A.; Boykin, P.O.; Figueiredo, R.J.;, "Towards P2P-routed IF overlay networks for grid virtual machines," High Performance Distributed Computing, 2005. HPDC-14. Proceedings. 14th IEEE International Symposium on , vol., No., pp. 293-294, Jul. 24-27, 2005.

"Virtual Routing: Bringing TCP/IP to a New Level." Interpeak AB. 2005. Pages 1-8. <http://www.interpeak.com/files/vr_white.pdf>.

Dacey, Andrew. "How ARP Works". Archived by the Internet Archive on Apr. 3, 2005: <http://web.archive.org/web/20050403205914/http://tildegrugal.net/tech/arp.php>. pp. 1-4.

* cited by examiner

| No. of Hops | Packet |
|---|---|
| 1 | Header \| Payload |
| 2 | Header \| Payload \| |
| 3 | Header \| Payload \| \| |
| 4 | Header \| Payload \| \| \| |

*FIG. 3*

TABLE 2

```
Layer 2

Bytes      Description

6     :    Destination MAC Address
6     :    Source MAC Address

Layer 3

Bytes      Description

1     :    Version
1     :    Type of Service
1     :    Time to Live, Control Flag
1     :    Protocol Number
4-16  :    Destination IP Address
4-16  :    Source IP Address Layer 4

Bytes      Description

2     :    Source Port
2     :    Destination Port
1     :    TCP Flag

Layer 5

Bytes      Description

2     :    DNI Flag
4     :    DNI SHA-1/MD5 Hash
```

FIG. 7

| Download Requests | Potential Downloads completed by Client | Percent Reduction in Resources |
|---|---|---|
| 1 | 0 | 0% |
| 2 | 1 | 50% |
| 3 | 2 | 66.67% |
| 4 | 3 | 75% |
| 5 | 4 | 80% |

Table 3

*FIG. 10*

OS – Operating System
TVM –Thin Virtual Machine
VM – Virtual Machine
VDRC – Virtual Dispersive Routing Client
VDRS – Virtual Dispersive Routing Server VDR Client and Server Architectures

SOFTWARE ROUTER FACILITATING NETWORK COMMUNICATIONS BETWEEN DEVICES UTILIZING VIRTUAL NETWORK CONNECTIONS

CROSS-REFERENCE TO RELATED APPLICATION

The present application is a U.S. continuation of, and claims priority under 35 U.S.C. §120 to, U.S. patent application Ser. No. 12/499,075, filed Jul. 7, 2009, which '075 application published as US 2010/0009758, and which '075 application is a continuation-in-part patent application of, and claims priority under 35 U.S.C. §120 to, U.S. patent application Ser. No. 12/253,926, filed October 17, 2008, which '926 application published as US 2009/0106439 and issued as U.S. Pat. No. 7,895,348, and which '926 application is a nonprovisional patent application of, and claims priority under 35 U.S.C. §119(e) to, each of U.S. provisional patent application 60/999,603 filed Oct. 17, 2007 and U.S. provisional patent application 61/133,935 filed Jul. 7, 2008; and which '075 application is a nonprovisional patent application of, and claims priority under §119(e) to, U.S. provisional patent application 61/133,935. The disclosure of the '603 application is set forth in Appendix A hereof, and the disclosure of the '935 application is set forth in Appendix B hereof. The disclosures of these Appendices as well as the priority applications and the patent application publications are incorporated herein by reference.

Additionally, several white papers and other disclosure documents describing aspects and features in accordance with one or more preferred embodiments of the present invention are attached hereto as Appendix C, and the disclosure contained in this Appendix is hereby incorporated herein by reference.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, is a computer program listing illustrating instructions, routines, and/or other contents of a computer program.

The computer program listing is for three computer file(s) that represents an embodiment of the invention. A table setting forth the name and size of each file included in the computer program listing is provided below.

TABLE 1

| File Name | Creation Date | Size in Bytes |
|---|---|---|
| ASCIFY.txt | Sep. 19, 2011 16:17 | 37473 |
| CODE.TXT | Sep. 19, 2011 16:18 | 527580 |
| readme.txt | Sep. 19, 2011 16:17 | 2573 |

One of these files, "readme.txt", contains instructions for utilizing a second of the files, "ascify.txt", to extract information from the other file, "code.txt". The other file is a compressed binary file that has been converted to ascii format. This file can be converted back to binary format utilizing an assembly conversion program source code for which is contained in "ascify.txt". The readme file includes instructions for compiling and running this conversion program, as well as instructions for converting the other text file to a compressed, binary file. The compressed, binary file includes files forming two sets of files for one or more computer programs.

The first set of files includes fifty-nine (59) computer files that may be utilized in accordance with an embodiment of the present invention. These files include source code written in C. These files are for a program that represents a proof of concept of routing at a client computer. The target hardware for this implementation includes a managed switch, two (2) Cisco® routers, and three (3) computers miming Linux. Additionally, submitted concurrently herewith via the USPTO's electronic filing system, and incorporated herein by reference, is a computer program listing illustrating instructions, routines, and/or other contents of another computer program.

The second set of files includes one hundred and twenty eight (128) computer files comprising software for a server and a client that may be utilized in accordance with an embodiment of the present invention. The second computer program listing includes source code written in C. These files are for an exemplary implementation which includes client software configured to be executed on a standard personal computer running Windows, and server software configured to be executed on a standard Linux server.

BACKGROUND OF THE INVENTION

The present invention generally relates to network routing and network communications.

Conventional networks, such as the Internet, rely heavily on centralized routers to perform routing tasks in accomplishing network communications. The vulnerability and fragility of these conventional networks make entities feel insecure about using them. There exist needs for improvement in network routing. One or more of these needs are addressed by one or more aspects of the present invention.

SUMMARY OF THE INVENTION

The present invention includes many aspects and features. Moreover, while many aspects and features relate to, and are described in, the context of network routing and network communications associated with the Internet, the present invention is not limited to use only in conjunction with the Internet and is applicable in other networked systems not associated with the Internet, as will become apparent from the following summaries and detailed descriptions of aspects, features, and one or more embodiments of the present invention.

Indeed, each of the independent claims as filed herewith represents an aspect of the invention and each dependent claim represents a feature of such aspect. In addition, it should be noted that the present invention further encompasses the various possible combinations and subcombinations of such aspects and features, including those relating to network routing and those relating to network communications.

A first network routing aspect of the present invention relates to a computer arranged in electronic communication with one or more computer networks, the computer running an operating system and running a plurality of applications, each of the applications programmed to communicate over a computer network. The computer is characterized in that, the computer performs a method comprising the steps of, for each application, creating, for such application, a virtual machine that is configured to send and receive communications over a computer network; determining, for such application, a network protocol out of a plurality of available network protocols, the determined network protocol representing an appropriate network protocol, out of the plurality of available network protocols, for current communication requirements of the application; and causing the application, when communicating over the network, to send and receive communications via the created virtual machine using the determined network protocol. Multiple virtual machine instances are created and simultaneously maintained by the computer, each virtual machine instance handling communications of one of the plurality of applications via a networking protocol that has been determined to be appropriate for the current communication requirements of the application.

In a feature of one or more aspects of the invention, the computer performs the method by executing a virtual dispersive routing program.

In a feature of one or more aspects of the invention, the computer is a personal computer.

In a feature of one or more aspects of the invention, the computer is a personal desktop computer.

In a feature of one or more aspects of the invention, the computer is a personal laptop or notebook computer.

In a feature of one or more aspects of the invention, the plurality of applications includes an email application, an internet browser application, and a streaming audio or video application.

In a feature of one or more aspects of the invention, the plurality of applications include a computer game.

In a feature of one or more aspects of the invention, the plurality of applications includes a massive multiplayer online role playing game.

In a feature of one or more aspects of the invention, the plurality of applications includes a video game.

In a feature of one or more aspects of the invention, the computer is a video game console.

In a feature of one or more aspects of the invention, the computer comprises a plurality of processing cores.

In a feature of one or more aspects of the invention, the computer comprises a plurality of processing cores, and wherein the computer performs the method by executing a multi-core virtual dispersive routing program.

In a feature of one or more aspects of the invention, different communication requirements differ at least in terms of maximum latency requirements and minimum bandwidth requirements.

Another aspect of the present invention relates to a method of providing network communications between first and second end-user devices. The method includes communicating, by a first end-user device, a request to a server to engage in communications with the second end-user device; communicating, by the server, the request received from the first end-user device to the second-end user device; communicating, by the second end-user device, acceptance to the server of the request to engage in communications with the first end-user device; communicating information associated with a third device to the first end-user device; using a virtual network connection of the first end-user device, establishing network communications with the third device using received information associated with the third device; communicating information associated with a third device to the second end-user device; using a virtual network connection of the second end-user device, establishing network communications with the third device using received information associated with the third device, wherein the third device is configured to act as a switch and provide cross-connect functionality between the first virtual network connection of the first end-user device and the second virtual network connection of the second end-user device; communicating, from the first end-user device using the first virtual network connection, a packet to the third device; and communicating, from the third device, the packet to the second end-user device via the second virtual network connection.

In a feature of this aspect, the step of communicating information associated with the third device to the first end-user device comprises communicating an IP address of the third device.

In a feature of this aspect, the step of communicating information associated with the third device to the second end-user device comprises communicating an IP address of the third device.

In a feature of this aspect, the step of establishing a first network connection with the third device using the information associated with the third device comprises selecting a routing protocol from among a plurality of available routing protocols for communicating data using virtualized network capabilities of the first end-user device, and wherein said step (i) comprises communicating the packet using the selected routing protocol. In at least some implementations, the plurality of available routing protocols includes the Interior Gateway Routing Protocol (IGRP), the Enhanced Interior Gateway Routing Protocol (EIGRP), the Border Gateway Protocol (BGP), and the Constrained Shortest Path First (CSPF) protocol.

In a feature of this aspect, the step of establishing a network connection with the third device using the information associated with the third device comprises selecting an initial node to which to transmit for communication with the third device. In at least some implementations, the step of selecting an initial node comprises selecting an initial node based at least partially on network information stored at the first end-user device. In at least some implementations, the method further includes a step of querying one or more nodes of a network for the network information. In at least some implementations, the method further includes receiving the network information from the one or more nodes and generating a routing table based on the network information.

In a feature of this aspect, the virtual machine is spawned in response to a request for a network connection from an application running on the first end-user device. In at least some implementations, the application is a computer game.

In a feature of this aspect, the first end-user device comprises a computer.

In a feature of this aspect, the first end-user device comprises a mobile phone.

In a feature of this aspect, the first and second end-user devices are the same type of device.

In a feature of this aspect, the third device is an end-user device.

In a feature of this aspect, the third device is a computer.

In a feature of this aspect, the third device is a mobile phone.

In a feature of this aspect, the third device is the same type of device as the first end-user device.

Another aspect of the present invention relates to a method of transferring data between first and second end-user devices via network communications. The method includes first, communicating by the first end-user device, to a server, network contact information of the first end-user device, and communicating by the second end-user device, to the server, network contact information of the second end-user device;

and thereafter, communicating data from the first end-user device to the second end-user device by, communicating, by the first end-user device, a request to the server to engage in communications with the second end-user device by the first end-user device, communicating, by the server, the request received from the first end-user device to the second end-user device, communicating, by the second end-user device, acceptance to the server of the request to engage in communications with the first end-user device, communicating information associated with a third device to the first end-user device, using a virtual network connection of the first end-user device, establishing a first network connection with the third device using received information associated with the third device, communicating information associated with a third device to the second end-user device, using a virtual network connection of the second end-user device, establishing a second network connection with the third device using received information associated with the third device, wherein the third device is configured to act as a switch and provide cross-connect functionality between the first network connection established with the first end-user device and the second network connection established with the second end-user device, communicating, from the first end-user device using the virtualized network capabilities of the virtual machine, a packet to the third device via the first network connection, and communicating, from the third device, the packet to the second end-user device via the second network connection.

Another aspect of the present invention relates to a system. The system includes a first end-user device comprising a processor, and one or more network adapters providing network capabilities, as well as a second end-user device comprising a processor, and one or more network adapters providing network capabilities. The system further includes a server comprising a processor, and one or more network adapters providing network capabilities. The system still further includes a third device comprising a processor, and one or more network adapters providing network capabilities. The first end-user device further includes one or more computer readable media containing computer executable instructions configured to communicate, to the server, a request to engage in communications with the second end-user device, and using a virtual network connection of the first end-user device, establish a first network connection with the third device using received information associated with the third device. The second end-user device further includes one or more computer readable media containing computer executable instructions configured to communicate, to the server, acceptance of the request to engage in communications with the first end-user device, and, using a virtual network connection of the second end-user device, establish a second network connection with the third device using received information associated with the third device. The server further includes one or more computer readable media containing computer executable instructions configured to communicate, to the second end-user device, a request received from the first end-user device, communicate information associated with a third device to the first end-user device, and communicate information associated with a third device to the second end-user device. The third device is configured to act as a switch and provide cross-connect functionality between the first network connection established with the first end-user device and the second network connection established with the second end-user device, and includes one or more computer readable media containing computer executable instructions configured to communicate, from the third device, a packet received from the first end-user device over the first network connection to the second device via the second network connection.

Another network routing aspect of the present invention relates to a computer arranged in electronic communication with one or more computer networks, the computer running an operating system and running a plurality of applications, each of the applications programmed to communicate over a computer network. The computer is characterized in that, the computer performs a method comprising the steps of, for each application, (a) creating, for such application, a first virtual machine that is configured to send and receive communications over the computer network; determining, for such application, a first network protocol out of a plurality of available network protocols, the first network protocol representing an appropriate network protocol, out of the plurality of available network protocols, for a first set of communication requirements of the application; and causing the application, when communicating over the network under the first set of communication requirements of the application, to send and receive communications via the first virtual machine using the first network protocol; and (b) creating, for such application, a second virtual machine that is configured to send and receive communications over the computer network, the second virtual machine being a separate virtual machine from that of the first virtual machine; determining, for such application, a second network protocol out of a plurality of available network protocols, the second network protocol representing an appropriate network protocol, out of the plurality of available network protocols, for a second set of communication requirements of the application, the second set of communication requirements being different from the first set; and causing the application, when communicating over the network under the second set of communication requirements of the application, to send and receive communications via the second virtual machine using the second network protocol. Multiple virtual machine instances are created and simultaneously maintained by the computer for each of the plurality of applications, each virtual machine instance handling communications under a set of communication requirements of one of the plurality of applications via a networking protocol that has been determined to be appropriate for such set of communication requirements of the application.

In a feature of one or more aspects of the invention, the computer performs the method by executing a virtual dispersive routing program.

In a feature of one or more aspects of the invention, the computer is a personal computer.

In a feature of one or more aspects of the invention, the computer is a personal desktop computer.

In a feature of one or more aspects of the invention, the computer is a personal laptop or notebook computer.

In a feature of one or more aspects of the invention, the plurality of applications includes an email application, an internet browser application, and a streaming audio or video application.

In a feature of one or more aspects of the invention, the plurality of applications includes a computer game.

In a feature of one or more aspects of the invention, the plurality of applications includes a massive multiplayer online role playing game.

In a feature of one or more aspects of the invention, the plurality of applications includes a video game.

In a feature of one or more aspects of the invention, the computer is a video game console.

In a feature of one or more aspects of the invention, the computer comprises a plurality of processing cores.

In a feature of one or more aspects of the invention, the computer comprises a plurality of processing cores, and wherein the computer performs the method by executing a multi-core virtual dispersive routing program.

In a feature of one or more aspects of the invention, different communication requirements differ at least in terms of maximum latency requirements and minimum bandwidth requirements.

Another network routing aspect of the present invention relates to a method of routing data over a network at a client device using virtualization. The method includes the steps of receiving a request for a network connection from an application running on the client device; spawning a virtual machine adapted to virtualize network capabilities of the client device; selecting a routing protocol from among a plurality of available routing protocols; determining a first node to communicate with, said determination being informed by network information stored on the client device; and communicating, using the selected routing protocol, data of the application to the first node.

In a feature of this aspect of the invention, said selection of a routing protocol is informed by information associated with the application.

In a feature of this aspect of the invention, the method further includes spawning another virtual machine adapted to virtualize network capabilities of the client device; selecting a second routing protocol from among a plurality of available routing protocols; determining a second node to communicate with, said determination being informed by network information stored on the client device; and communicating, using the selected second routing protocol, data of the application to the second node.

In a feature of this aspect of the invention, the method further includes, prior to said step of spawning another virtual machine, the step of determining that the application requires another network connection.

In a feature of this aspect of the invention, the step of determining that the application requires another network connection comprises determining whether a current network connection can meet performance requirements of the application.

In a feature of this aspect of the invention, said step of communicating comprises transmitting packets of data.

In a feature of one or more aspect of the invention, said packets are IP packets.

In a feature of this aspect of the invention, the method further includes, prior to the step of receiving a request for a network connection, the steps of querying a network for the network information; and storing the network information in a computer readable medium.

In a feature of this aspect of the invention, the method further includes, prior to the step of receiving a request for a network connection, the steps of querying a network for data relating to the network, generating a routing table based on the data relating to the network, and storing the routing table in a computer readable medium. The network information that informs said determining step comprises information stored in the routing table.

In a feature of one or more aspects of the invention, the plurality of available routing protocols includes the Interior Gateway Routing Protocol (IGRP).

In a feature of one or more aspects of the invention, the plurality of available routing protocols includes the Enhanced Interior Gateway Routing Protocol (EIGRP).

In a feature of one or more aspects of the invention, the plurality of available routing protocols includes the Border Gateway Protocol (BGP).

In a feature of one or more aspects of the invention, the plurality of available routing protocols includes the Constrained Shortest Path First (CSPF) protocol.

In a feature of one or more aspects of the invention, the selected routing protocol is ported to run on a chip core.

In a feature of one or more aspects of the invention, the selected routing protocol is run on multiple cores.

In a feature of one or more aspects of the invention, the plurality of available routing protocols includes pro-active routing algorithms.

In a feature of one or more aspects of the invention, the plurality of available routing protocols includes reactive routing algorithms.

In a feature of one or more aspects of the invention, the plurality of available routing protocols includes flow oriented routing algorithms.

In a feature of one or more aspects of the invention, the plurality of available routing protocols includes adaptive routing algorithms.

In a feature of one or more aspects of the invention, the plurality of available routing protocols includes hybrid routing algorithms.

In a feature of one or more aspects of the invention, the plurality of available routing protocols includes hierarchical routing algorithms.

In a feature of one or more aspects of the invention, the plurality of available routing protocols includes geographical routing algorithms.

In a feature of one or more aspects of the invention, the plurality of available routing protocols includes power aware routing algorithms.

Another network routing aspect of the present invention relates to a method for providing information relating to a node along a network path. The method includes receiving, at a first node, a packet transmitted by a client device, the packet including a header and a payload; storing, at the first node, information from the packet in a computer readable medium; appending, to the payload of the packet, information associated with the first node; determining a second node to transmit the packet to, said determination being informed by network information stored on the first node; and transmitting the packet to the second node.

In a feature of this aspect of the invention, the information from the packet includes information relating to a routing protocol, and wherein said transmitting step comprises transmitting the packet utilizing the routing protocol.

Another network routing aspect of the present invention relates to a method of determining a path of a packet. The method includes receiving a packet including a header and a payload, the payload including information appended to the payload by each of a plurality of nodes, the information appended to the payload by each of the plurality of nodes including information associated with the node that appended it; storing the payload in a computer readable medium; and analyzing the information appended to the payload by each of the plurality of nodes to determine a path of the packet.

In a feature of this aspect of the invention, the method further includes determining whether the path of the packet satisfies previously defined connection requirements.

Another network routing aspect of the present invention relates to a method of responding to a dropped connection. The method includes transmitting a packet to a first node using a first routing protocol for communication to a destination device; setting a predefined timer, the predefined timer having a value corresponding to an amount of time greater than an average response time of the destination device; and upon expiration of the predefined timer, automatically transmitting the packet to a second node using a second routing protocol for communication to the destination device.

In a feature of this aspect of the invention, the first routing protocol and the second routing protocol are the same routing protocol.

In a feature of this aspect of the invention, the first node and the second node are the same node.

Another network routing aspect of the present invention relates to a method of responding to a corrupted packet. The method includes receiving a packet from a transmitting device at a first virtual machine of a destination device; determining whether the packet has been tampered with, said determination being informed by information from an application running on the client device; quarantining the packet; spawning a new virtual machine at the destination device; and communicating, using the new virtual machine, with the transmitting device.

In a feature of this aspect of the invention, said step of communicating comprises communicating using a routing protocol different from a routing protocol used to transmit the packet.

In a feature of this aspect of the invention, said step of communicating comprises communicating using a path different from a path used to transmit the packet.

In a feature of this aspect of the invention, the method further includes shutting down the first virtual machine.

Another network routing aspect of the present invention relates to a method of responding to a network attack. The method includes communicating with a remote device through a first virtual machine of a client device; detecting a network attack at the first virtual machine of the client device; spawning a second virtual machine at the client device; and communicating with the remote device through the second virtual machine of the client device.

In a feature of this aspect of the invention, said step of communicating through a first virtual machine comprises communicating via a path and said step of communicating through the second virtual machine comprises communicating via a different path.

In a feature of this aspect of the invention, said step of communicating through a first virtual machine comprises communicating via a network protocol and said step of communicating through the second virtual machine comprises communicating via a different network protocol.

In a feature of this aspect of the invention, the method further includes shutting down the first virtual machine.

In a feature of this aspect of the invention, the method further includes monitoring communications received through the first virtual machine.

In a feature of this aspect of the invention, the method further includes generating a third virtual machine; determining a source of the network attack; and initiating a retaliatory network attack through the third virtual machine against the source of the network attack.

Another network routing aspect of the present invention relates to a method of routing data over a network at a client device using virtualization. The method includes detecting a request for a network connection from an application running on the client device; determining, from the application, application-specific information associated with the application; using the application-specific information, selecting a routing protocol from among a plurality of available routing protocols; and using the selected routing protocol, transmitting data of the application from the client device over the network.

Another network routing aspect of the present invention relates to a method of routing data over a network at a client device using virtualization. The method includes the steps of detecting, at a virtual router on the client device, a request for a network connection from an application running on the client device; spawning, by the virtual router, a virtual machine adapted to virtualize network capabilities of the client device; selecting, by the virtual router, a routing protocol from among a plurality of available routing protocols; and communicating, using the selected routing protocol, data of the application to the first node.

Another network routing aspect of the present invention relates to a method of routing data over a network at a client device using virtualization. The method includes the steps of detecting, at a virtual router on the client device, a request for a network connection from an application running on the client device; selecting, by the virtual router, a routing protocol from among a plurality of available routing protocols; determining, by the virtual router, a first node to communicate with, said determination being informed by network information stored on the client device; and using a virtual machine on the client device, communicating, using the selected routing protocol, data of the application to the first node.

Another network routing aspect of the present invention relates to a method of routing data over a network at a client device using virtualization. The method includes detecting, at a virtual router on the client device, a request for a network connection from an application running on the client device; spawning, by the virtual router, a virtual machine adapted to virtualize network capabilities of the client device; selecting, by the virtual router, a routing protocol from among a plurality of available routing protocols; determining, by the virtual router, a first node to communicate with according to the selected routing protocol; and, using a virtual machine on the client device, communicating data of the application to the first node.

Another network routing aspect of the present invention relates to a method of routing data over a network at client devices using virtualization. The method includes the steps of detecting, at a first virtual router on a first client device, a request for a network connection from an application running on the first client device; selecting, by the first virtual router, a routing protocol from among a plurality of available routing protocols; using a virtual machine on the first client device, transmitting, according to the routing protocol selected by the first virtual router, data of the first client device application from the first client device over the network; receiving the data at a second client device; detecting, at a second virtual router on the second client device, a request for a network connection from an application running on the second client device; selecting, by the second virtual router, a routing protocol from among a plurality of available routing protocols; and using a virtual machine on the second client device, transmitting, according to the routing protocol selected by the second virtual router, data of the second client device application from the second client device over the network.

In a feature of this aspect of the invention, the first routing protocol is different from the second routing protocol.

Another network routing aspect of the present invention relates to a method of determining a routing path of a packet. The method includes receiving, at a client device in a network, a packet including a header and a payload, the payload including information appended to the payload by at least one other node in the network, the information appended to the payload by each of the at least one network node including information associated with the node that appended it; analyzing, at a virtual router on the client device, the information appended to the payload by each of the at least one network node; based at least partly on the analyzed information, selecting, by the virtual router, a routing protocol from among a plurality of available routing protocols; and transmitting, according to the routing protocol selected by the virtual router, the packet over the network.

Another network routing aspect of the present invention relates to a method of determining a routing path of a packet, comprising: receiving, at a client device in a network, a packet including a header and a payload, the payload including information appended to the payload by at least one other node in the network, the information appended to the payload by each of the at least one network node including information associated with the node that appended it; based at least partly on content of the payload, selecting, by a virtual router on the client device, a routing protocol from among a plurality of available routing protocols; appending additional information, including information associated with the client device, to the payload; and transmitting, according to the routing protocol selected by the virtual router, the packet, included the appended payload, over the network.

Another network routing aspect of the present invention relates to a virtual dispersive routing software client stored in a computer readable medium of a client device. The virtual dispersive routing software includes a virtual machine manager (also referred to as a virtual machine monitor), adapted to spawn virtual machines; a routing platform including software adapted to implement a plurality of routing protocols; a controller adapted to intercept network requests intended for a network card; and an application interface adapted to communicate information relating to an application running on the client device to the controller.

Another network routing aspect of the present invention relates to the application interface.

Another network routing aspect of the present invention relates to a spider comprising a connective link between an upper level and a lower level of a protocol stack.

In a feature of one or more aspects of the present invention, the computer is a handheld mobile device.

In a feature of one or more aspects of the present invention, the computer is a mobile phone.

In a feature of one or more aspects of the present invention, the plurality of available routing protocols includes the Open Shortest Path First (OSPF) protocol.

In a feature of one or more aspects of the present invention, the network is a wireless network.

In a feature of one or more aspects of the present invention, the network is a Wi-Fi network.

Another network routing aspect of the present invention relates to a method of utilizing information from one layer of a protocol stack to inform decisions at another layer of the protocol stack.

The method includes loading a spider configured to thread together an upper application layer and a lower layer of a protocol stack; receiving a packet at the lower layer; running a checksum on the packet; and determining whether a value returned from the checksum corresponds to a value associated with the application layer.

Another network routing aspect of the present invention relates to a method of utilizing a spider. The method includes loading a spider configured to thread together a first layer and a second layer of a protocol stack; and utilizing information associated with the first layer to inform a decision at the second layer.

With regard to the aspects and features in network communications in accordance with the present invention, reference is made to the claims as filed in the incorporated '075 application, and in particular claims 170-489, which claims are incorporated herein by reference.

BRIEF DESCRIPTION OF THE DRAWINGS

One or more preferred embodiments of the present invention now will be described in detail with reference to the accompanying drawings.

FIG. 3 illustrates the addition of data to the payload of a packet on each of a plurality of hops in accordance with an embodiment of the present invention.

FIG. 7 includes Table 2, which table details data stored by a node in the payload of a packet.

FIG. 10 includes Table 3, which illustrates potential resource reduction in accordance with one or more preferred implementations.

DETAILED DESCRIPTION

Figure 1:
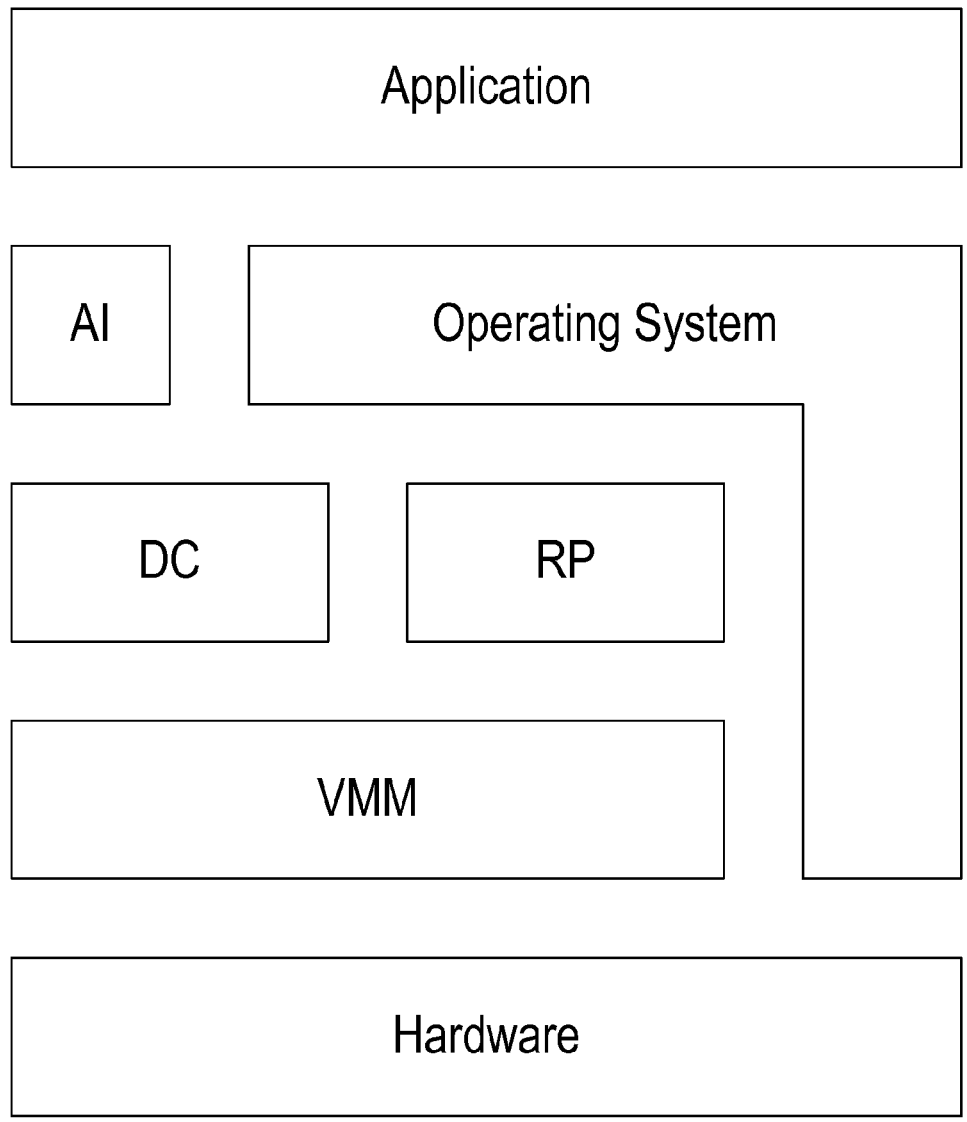
FIG. 1 illustrates components of a VDR software client loaded onto a client device in accordance with an embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Further, as used herein, the term server may be utilized to refer to both a single server, or a plurality of servers working together.

Additionally, as used herein, "an open network connection" (also referred to as a "direct connection") generally means a network pathway of router nodes that extends between two end-user devices whereby data is sent from one of the end-user devices to the other end-user device without connecting to a server, or an equivalent pathway where the data that is sent is neither stored nor forwarded by a server.

As used herein, a "client device" (sometimes simply referred to herein as a "client") is a device on which an application runs that utilizes network communication. Furthermore, a client device is sometimes referred to as an "end device", "end-user device", "end-client device", or simply "destination device" as the application on the client device is the end recipient of a network communication in some scenarios. The client device also is sometimes referred to as a "mobile device" as the client device may be portable in some scenarios, such as when the client device comprises, for example, a mobile phone, a laptop computer, or a notebook computer.

A "transmitting device" is a device disposed in network communications with a client device, and itself may be a client device or a network device, including a conventional, centrally located specialized routing device. Similarly, a "remote device" is a device with which a client device communicates, and the remote device may be another client device or a network device.

A "computer" as used herein has a processor and is capable of running an application that utilizes network communication. The processor may have a single processing core or a plurality of processing cores. Examples of a computer include a personal desktop; a laptop; a notebook; a mobile communications device; a handheld mobile device, such as a mobile phone; and a video game console. Furthermore, it is contemplated that a computer may be a client device.

Finally, as used herein, a "network" is a communications network by which communications are sent, received, or both. A network may comprise, for example, the Internet, an Intranet or an Extranet. A network may utilize CDMA, WiMax, GSM, WCDMA, or other communication technologies, and may include wired and wireless transmissions.

Referring now to the drawings, one or more preferred embodiments of the present invention are next described. The following description of one or more preferred embodiments is merely exemplary in nature and is in no way intended to limit the invention, its implementations, or uses.

VDR

Virtual dispersive routing (hereinafter, "VDR") relates generally to providing routing capabilities at a plurality of client devices using virtualization. Whereas traditional routing calls for most, if not all, routing functionality to be carried out by centrally located specialized routing devices, VDR enables dispersed client devices to assist with, or even takeover, routing functionality, and thus is properly characterized as dispersive. Advantageously, because routing is performed locally at a client device, a routing protocol is selected by the client based upon connection requirements of the local application initiating the connection. A protocol can be selected for multiple such connections and multiple routing protocols can even be utilized simultaneously. The fragile nature of the routing protocols will be appreciated, and thus virtualization is utilized together with the localization of routing to provide a much more robust system. Consequently, such dispersive routing is properly characterized as virtual.

More specifically, preferred VDR implementations require that a VDR software client be loaded on each client device to help control and optimize network communications and performance. Preferably, VDR is implemented exclusively as software and does not include any hardware components. Preferably, the basic components of a VDR software client include a routing platform (hereinafter, "RP"); a virtual machine monitor (hereinafter, "VMM"); a dispersive controller (hereinafter, "DC"); and an application interface (hereinafter, "AI"). FIG. 1 illustrates each of these components loaded onto a client device. Each of these components is now discussed in turn.

The Routing Platform (RP) and Multiple Routing Protocols

Despite eschewing the traditional routing model utilizing central points of control, VDR is designed to function with existing routing protocols. Supported routing protocols, together with software necessary for their use, are included in the routing platform component of the VDR software, which can be seen in FIG. 1. For example, the RP includes software to implement and support the Interior Gateway Routing Protocol ("IGRP"), the Enhanced Interior Gateway Routing Protocol ("EIGRP"), the Border Gateway Protocol ("BGP"), the Open Shortest Path First ("OSPF") protocol, and the Constrained Shortest Path First ("CSPF") protocol. It will be appreciated that in at least some embodiments, a port will be needed to allow conventional routing software to run on a chip core (for example, a core of an Intel chip) at a client device. Preferably, multi-core components are used to allow routing protocols to be run on multiple cores to improve overall performance.

Moreover, it will be appreciated that the ability to support multiple routing protocols allows VDR to meet the needs of applications having varying mobility requirements. Applications can be supported by ad hoc algorithms such as pro-active (table driven) routing, reactive (on-demand) routing, flow oriented routing, adaptive (situation aware) routing, hybrid (pro-active/reactive) routing, hierarchical routing, geographical routing, and power aware routing. Further, the use of multiple protocols supports broadcasting, multi-casting, and simul-casting. It will be appreciated that the use of multiple protocols provides support for multi-threaded networking as well.

The Virtual Machine Monitor (VMM) and Virtualization

It will be appreciated that virtualization is known in some computing contexts, such as virtualization of memory and processing. Virtualization enables the abstraction of computer resources and can make a single physical resource appear, and function, as multiple logical resources. Traditionally, this capability enables developers to abstract development of an application so that it runs homogenously across many hardware platforms. More generally, virtualization is geared to hiding technical detail through encapsulation. This encapsulation provides the mechanism to support complex networking and improved security that is required to enable routing at client devices.

More specifically, a virtual machine (hereinafter, "VM") is a software copy of a real machine interface. The purpose of running a VM is to provide an environment that enables a computer to isolate and control access to its services. The virtual machine monitor (VMM) component is used to run a plurality of VMs on a real machine and interface directly with that real machine. As an example, consider a VMM on a real machine that creates and runs a plurality of VMs. A different operating system is then loaded onto each VM. Each VM provides a virtual interface that would appear to each operating system to be a real machine. The VMM runs the plurality of VMs and interfaces with the real machine.

In a VDR implementation, a VMM is utilized to create a VM for each distinct connection, wherein each "connection" generally comprises a transfer of data in the form of packets from a first end device to a second end device along a path (or route). It will be appreciated that a single application can require multiple connections. For example, an application may require multiple connections because of bandwidth application requirements and performance requirements. In this event each connection preferably interfaces with its own VM, and each connection can utilize (sometimes referred to as being tied to) the same routing protocol or different routing protocols, even though the connections are themselves necessitated by the same application. Similarly, although two connections may at times travel along an identical path, the connections themselves may nevertheless be distinct, and each will preferably still continue to interface with its own VM.

The Dispersive Controller (DC) and Optimizing Performance

When the client is in need of a new connection, a dispersive controller located between an operating system and a driver that controls network hardware (such as a NIC card) intercepts the request for a new connection and tells the VMM to spawn a new VM associated with the desired connection. The DC then queries the application interface and utilizes any information obtained to select a routing protocol from among those supported by the RP. This selected routing protocol, however, is currently believed to be generally useless without knowledge of the surrounding network. To this end, the DC allows each client to find other clients, interrogate network devices, and utilize system resources. Thus, each VDR client is "network aware", in that routing information is gathered and maintained at each client by the DC.

Figure 2:
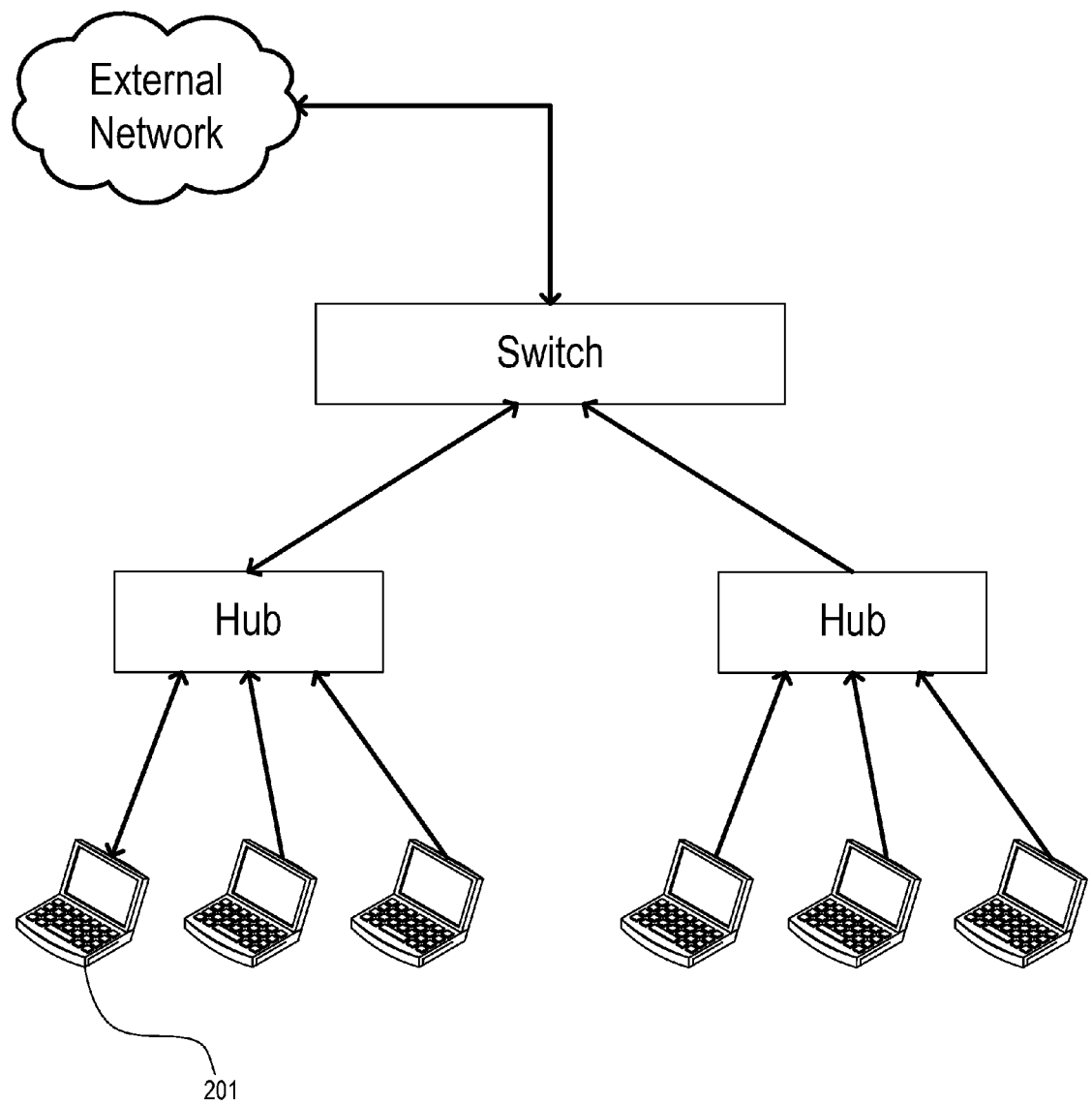
FIG. 2 illustrates an exemplary network in which a VDR client gathers LAN routing information and queries an external network for backbone information and application-specific routing information in accordance with an embodiment of the present invention.

FIG. 2 illustrates a network in which a VDR client 201 gathers LAN routing information and queries an external network for backbone information and application-specific routing information. In response to these queries, routing information is returned. This returned routing information is cached, processed, data mined, compared to historical data, and used to calculate performance metrics to gauge and determine the overall effectiveness of the network. This is possible because the resources available at a VDR client will typically be greater than those available at a conventional router.

In at least some embodiments, a VDR network functions in some ways similarly to a conventional network. In a conventional network, data, in the form of packets, is sent to a router to be routed according to a routing table maintained at the router. Similarly, in a VDR network, after utilizing gathered network information to generate a routing table, a client device utilizes this generated routing table to select a route and transmit a packet accordingly, which packet is then received by another client device and routed according to that client's routing table, and so on, until the packet reaches its destination.

However, rather than simply passing on received packets from client to client, in a manner akin to a traditional router, VDR, via the DC, instead takes advantage of the storage and processing resources available at each client, while still remaining compatible with existing network architecture, by attaching lower level protocol data to the payload of transmitted packets for subsequent client analysis.

More specifically, when a packet is received at a VDR client, a virtual machine intercepts the packet passed from the networking hardware (for example, a NIC card) and places it in memory. The VDR client then processes the packet data. When the data is subsequently passed on, this processed data is appended to the payload of the packet together with information relating to the VDR client for analysis at the destination. As can be seen in FIG. 3, the result of this process is that each hop causes additional information to be added to the payload of a packet, and thus results in a direct increase in payload size proportionate to the number of hops taken by the packet. Specifically, each hop is believed to result in an increase of 35 bytes for an IPv4 implementation, and 59 bytes for an IPv6 implementation. Table 2 of FIG. 7 details the information stored from each layer, along with the number of bytes allotted for each field. It will be appreciated that different or additional information could be stored in alternative embodiments.

Currently, 128-bit addressing provides support for IPv4 and IPv6 addressing, but support for additional addressing schemes is contemplated. It will be appreciated that for a typical communication over the Internet, i.e., one consisting of around 20 hops, the overhead appended to the payload will be around 700 bytes utilizing IPv4 and around 1180 bytes utilizing IPv6. It is believed that, in a worst case scenario, an extra IP datagram could be required for every datagram sent. Although some of this data may seem redundant at first blush, some repetition is tolerable and even necessary because network address translation ("NAT") can change source or destination fields. That being said, it is contemplated that some implementations use caching to lower this overhead. Additionally, in at least some implementations, the VDR client utilizes application specific knowledge to tailor the information that is appended to the needs of a specific application.

Conventionally, when a packet is received at a router, routing information is typically stripped off each packet by the router and disregarded. This is because each router has limited memory and handles an enormous number of packets. When a packet is received at a destination VDR client, however, the destination client has sufficient resources to store and process the information delivered to it. Additionally, to the extent that client resources may be taxed, the VDR client need not always store this information in every packet received, as in at least some embodiments application knowledge provides the client with an understanding of which packets are important to applications running on the client. Regardless of whether some or all of this information delivered in the payload of each data packet is processed, the information that is processed is analyzed to create a "network fingerprint" of the nodes involved in the communication link. Thus, VDR software loaded on nodes along a path enables the nodes to append information regarding a path of a packet, which in turn enables the generation of a network fingerprint at the destination device, which network fingerprint represents a historical record that is stored and maintained for later forensic analysis. In addition to forensic analysis by the client, the maintenance of network information on the client enables forensic analysis by a server as well.

The Application Interface (AI) & Application Knowledge

One of the benefits of providing routing functionality at a client device is that the client is able to utilize its knowledge of the application initiating a connection to enhance routing performance for that application. This knowledge is provided to the DC via an application interface, as can be seen in FIG. 1. Utilizing application knowledge to enhance routing performance could be useful to a variety of applications, such as for example, computer games including massively multiplayer online role playing games.

The virtualization of routing functionality at a client device, as described hereinabove, allows multiple routing protocols and algorithms to be run simultaneously on a client device. Thus, the DC utilizes the application interface to obtain required criteria for an application connection and then chooses from among the protocols and algorithms available via the RP.

For example, Application "A" may need to communicate very large amounts of data, and thus require a routing protocol that optimizes bandwidth, while Application "B" may only need to communicate very small amounts of data at very fast speeds, and thus require a routing protocol that minimizes latency irrespective of bandwidth. A traditional router cannot tell the difference between packets originating from Application "A" and those originating from Application "B", and thus will utilize the same routing protocol for packets from each application. A VDR client, however, is aware of applications running locally, and thus can be aware, through the AI, of various connection criteria for each application. These connection criteria can then be utilized by the VDR client in selecting a routing protocol or algorithm. Furthermore, as described hereinabove, both the selected routing protocol and the originating application associated with a packet can be communicated to other client nodes via data appended to the payload of the packet. Thus, the protocol selected at a source client can be utilized to route the packet throughout its path to a destination client. Further, because virtualization allows multiple routing protocols to be run on a single client, each application can utilize its own routing protocol.

Moreover, a VDR client can utilize knowledge of the path of a specific connection to further optimize performance. Because a network fingerprint can be gathered detailing the nodes in a communication path, a VDR client running on a client device can analyze each network fingerprint to determine whether the associated connection satisfies the connection criteria of the application desiring to utilize the connection. If the connection does not satisfy the connection criteria, then the client can attempt to find a connection that does satisfy the criteria by switching to a different protocol and/or switching to a different first node in its routing table. Combinations utilizing various protocols and selecting a variety of first nodes can be attempted, and the resultant paths evaluated until a path is found that does satisfy connection criteria. Additionally, combinations utilizing various protocols and selecting a variety of first nodes can be utilized to create route redundancy. Such route redundancy can provide to an application both higher bandwidth and controllable quality of service.

Although connection criteria for source and destination clients will often be identical, there are many situations where this will not be the case. For example, if one client is downloading streaming video from another client, then the connection requirements for each client will likely not be identical. In this and other situations, connections between two clients may be asymmetrical, i.e., client "A" transmits packets to client "B" over path 1, but client "B" transmits packets to client "A" over path 2. In each case, because path information gleaned from the payload of packets is stored and processed at the destination client, the evaluation of whether the path meets the required connection criteria is made at the destination client. In the example above, client "B" would determine whether path 1 satisfies its application's connection criteria, while client "A" would determine whether path 2 satisfies its application's connection criteria.

Perhaps the epitome of a connection that does not satisfy connection criteria is a broken, or failed, connection. In the event of a connection break, VDR enjoys a significant advantage over more traditional routing. Conventionally, recognition of a connection break would require a timeout at an upper level application, with either the path being re-routed subsequent to the timeout or a connection failure message being presented to a user. A VDR client, however, is aware of generally how long it should take to receive a response to a transmitted communication, and can utilize this awareness to speed up route convergence for additional network connections to insure application robustness and performance requirements, performance requirements being defined as criteria that must be met to allow the application to run properly, i.e., video conferencing can't wait too long for packets to show up or else the audio "crackles" and the image "freezes." For example, a VDR client may be aware that it should receive a response to a communication in 500 ms. If a response has not been received after 500 ms, the VDR client can initiate a new connection utilizing a different routing protocol and/or first node as outlined above with respect to finding a satisfactory connection path.

In addition to performance optimization, application knowledge can also be utilized to enhance network security. For example, an application may have certain security requirements. A VDR client aware of these requirements can create a "trusted network" connection that can be used to transfer information securely over this connection in accordance with the requirements of the application. A more traditional routing scheme could not ensure such a trusted connection, as it could not differentiate between packets needing this secure connection and other packets to be routed in a conventional manner.

But before elaborating on security measures that may be built in to a VDR implementation, it is worth noting that a VDR client is able to work in concert with an existing client firewall to protect software and hardware resources. It will be appreciated that conventional firewalls protect the flow of data into and out of a client and defend against hacking and data corruption. Preferably, VDR software interfaces with any existing client firewall for ease of integration with existing systems, but it is contemplated that in some implementations VDR software can include its own firewall. In either implementation, the VDR software can interface with the firewall to open and close ports as necessary, thereby controlling the flow of data in and out.

In addition to this firewall security, by utilizing application knowledge the VDR software can filter and control packets relative to applications running on the client. Thus, packets are checked not only to ensure a correct destination address, but further are checked to ensure that they belong to a valid client application.

One way VDR software can accomplish this is by utilizing "spiders" to thread together different layers of the protocol stack to enable data communication, thereby reducing delays and taking advantage of network topologies. Each spider represents software that is used to analyze data from different layers of the software stack and make decisions. These threaded connections can be used to speed data transfer in static configurations and modify data transfer in dynamic circumstances. As an example, consider a client device running a secure email application which includes a security identification code. Packets for this application include a checksum that when run will come up with this identification code. A spider would allow this upper level application security identification code to be connected to the lower layer. Thus, the lower layer could run a checksum on incoming packets and discard those that do not produce the identification code. It will be appreciated that a more complex MD5 hash algorithm could be utilized as well.

Moreover, because the VDR software is knowledgeable of the application requiring a particular connection, the software can adaptively learn and identify atypical behavior from an outside network and react by quarantining an incoming data stream until it can be verified. This ability to match incoming data against application needs and isolate any potential security issues significantly undermines the ability of a hacker to gain access to client resources.

Additionally, when such a security issue is identified, a VDR client can take appropriate steps to ensure that it does not compromise the network. Because a VDR client is network aware and keeps track of other clients that it has been communicating with, when a security issue is identified, the VDR client can not only isolate the suspect connection, the VDR client can further initiate a new connection utilizing a different routing protocol and/or first node as outlined above with respect to finding a satisfactory connection path. Alternatively, or additionally, the VDR client could simply choose to switch protocols on the fly and communicate this switch to each client with which it is in communication.

Figure 4A:
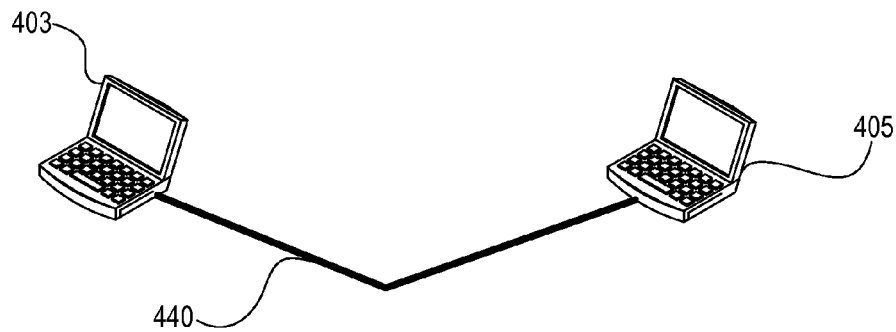
FIGS. 4A-C provide a simplified example of a VDR software response to a network attack in accordance with an embodiment of the present invention.
Figure 4B:
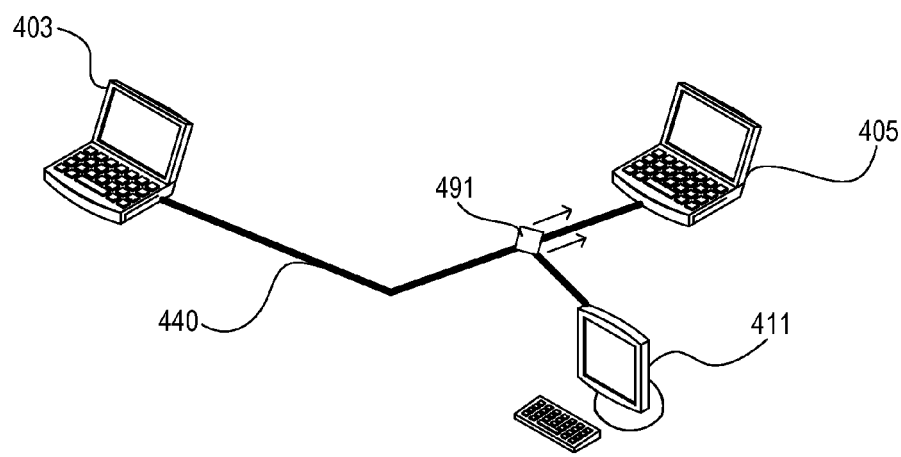
Figure 4C:
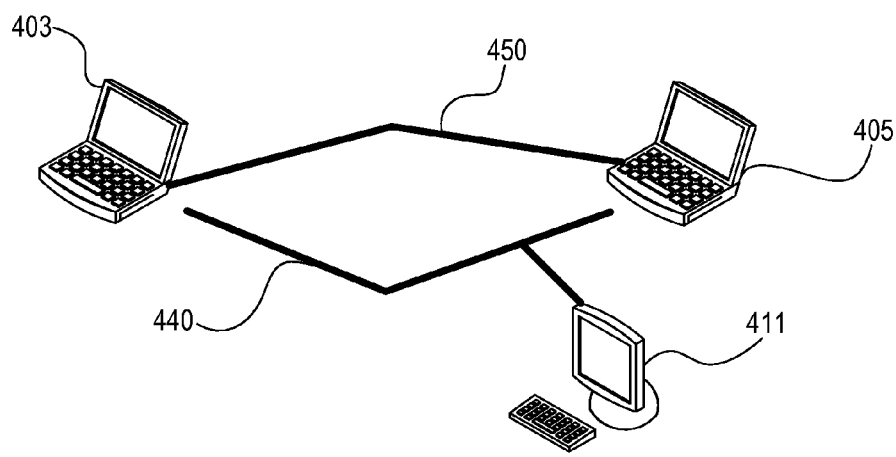

FIGS. 4A-C provide a simplified example of such action for illustrative effect. In FIG. 4A, VDR client 403 is communicating with VDR client 405 over connection 440. In FIG. 4B, external computer 411 tries to alter packet 491 transmitted from client 403 to client 405. Client 405 runs a hashing algorithm on the received packet 491 and identifies that it has been corrupted. Client 405 then quarantines packets received via connection 440 and, as can be seen in FIG. 4C, establishes a new connection 450 with client 403.

Upon discovery of an "attack" on a network or specific network connection, a VDR client can monitor the attack, defend against the attack, and/or attack the "hacker". Almost certainly, a new, secure connection will be established as described above. However, after establishing a new connection, the VDR client can then choose to simply kill the old connection, or, alternatively, leave the old connection up so that the attacker will continue to think the attack has some chance of success. Because each connection is virtualized, as described hereinabove, a successful attack on any single connection will not spill over and compromise the client as a whole, as crashing the VM associated with a single connection would not affect other VMs or the client device itself. It is contemplated that a VDR client will attempt to trace back the attack and attack the original attacker, or alternatively, and preferably, communicate its situation to another VDR client configured to do so.

An Exemplary Implementation

Traditionally, wired and wireless networks have tended to be separate and distinct. Recently, however, these types of networks have begun to merge, with the result being that the routing of data around networks has become much more complex. Further, users utilizing such a merged network desire a high level of performance from the network regardless of whether they are connected wirelessly or are connected via a fixed line. As discussed hereinabove, VDR enables a client to monitor routing information and choose an appropriate routing protocol to achieve the desired performance while still remaining compatible with existing network architecture. VDR can be implemented with wired networks, wireless networks (including, for example, Wi-Fi), and networks having both wired and wireless portions.

Figure 5:
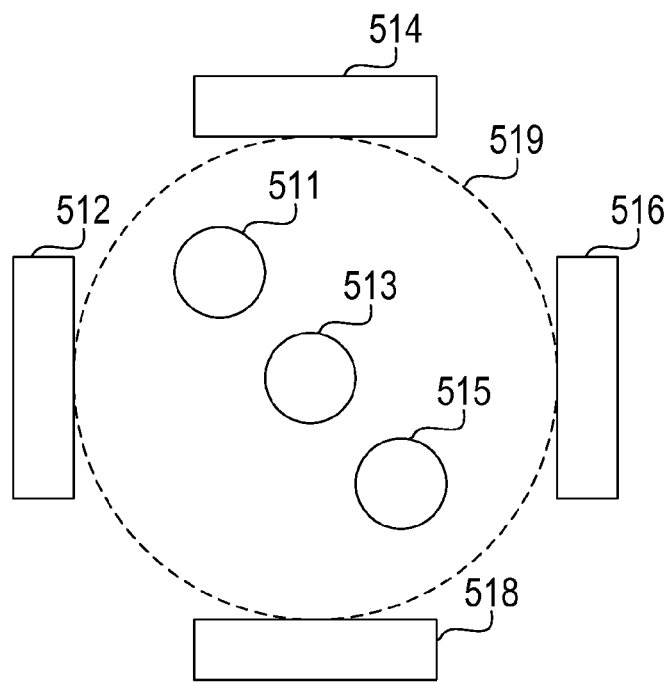
FIGS. 5 and 6A-B illustrate an exemplary VDR implementation in accordance with a preferred embodiment of the present invention.

FIG. 5 illustrates an exemplary local area network 510 (hereinafter, "LAN") utilizing VDR. The LAN 510 includes three internal nodes 511,513,515, each having VDR software loaded onto a client of the respective node. The internal nodes 511,513,515 can communicate with one another, and further can communicate with edge nodes 512,514,516,518, each also having VDR software loaded onto a client of the respective node. The coverage area 519 of the LAN 510 is represented by a dotted circle. It will be appreciated that the edge nodes 512,514,516,518 are located at the periphery of the coverage area 519. The primary distinction between the internal nodes 511,513,515 and the edge nodes 512,514,516,518 is that the internal nodes 511,513,515 are adapted only to communicate over the LAN 510, while the edge nodes 512, 514,516,518 are adapted to communicate both with the internal nodes 511,513,515 and with edge nodes of other LANs through one or more wide area networks (hereinafter, "WANs"). As one of the nodes 511,513,515 moves within the LAN 510 (or, if properly adapted, moves to another LAN or WAN), VDR allows it to shift to ad hoc, interior, and exterior protocols. This ability to shift protocols allows the node to select a protocol which will provide the best performance for a specific application.

Figure 6A:
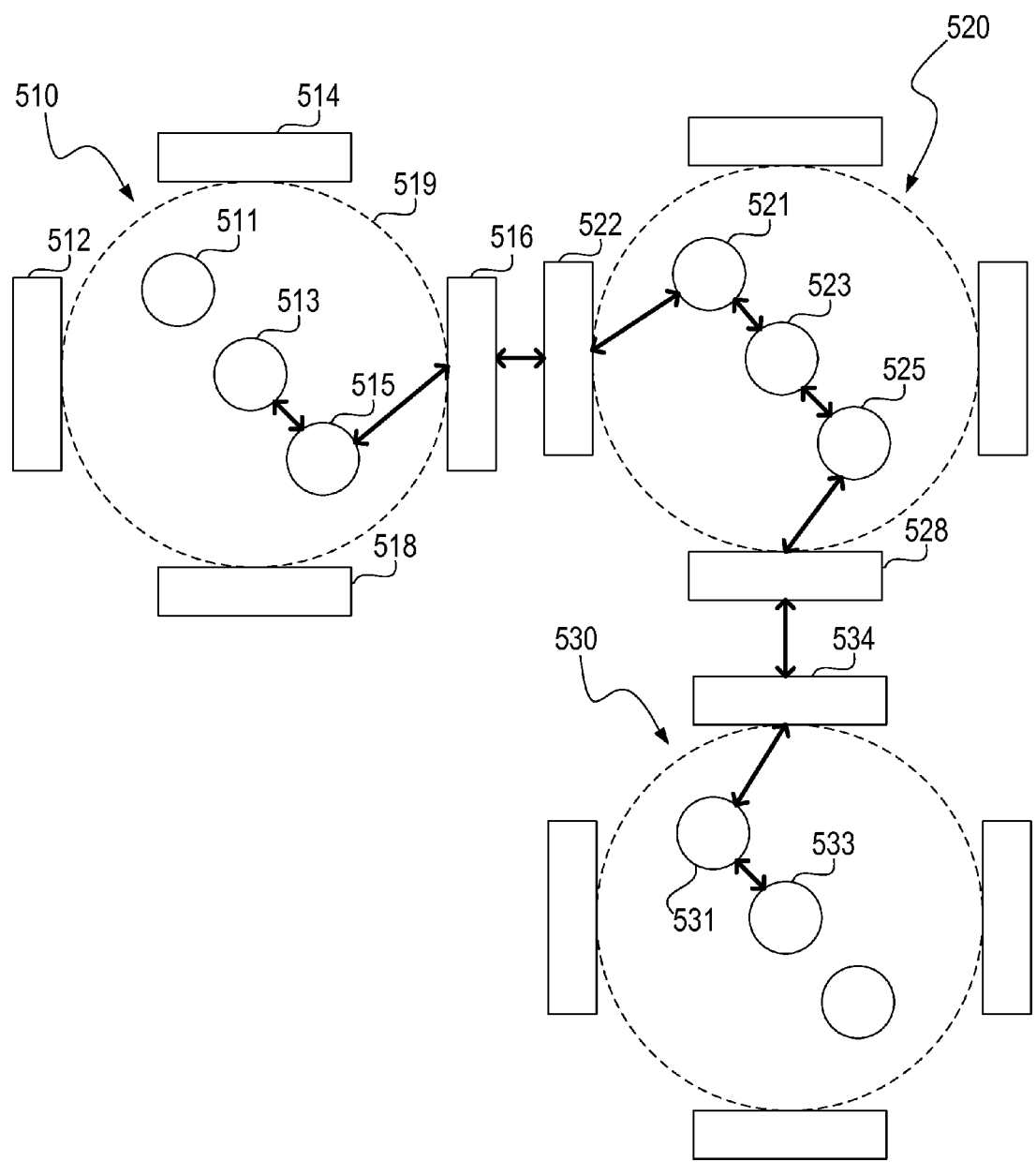

FIG. 6A illustrates an exemplary path between node 513 in LAN 510 and node 533 in LAN 530. It will be appreciated that an "interior" protocol is utilized for communications inside each LAN, and an "exterior" protocol is utilized for communications between edge nodes of different LANs. Thus, it will likewise be appreciated that each edge node must utilize multiple protocols, an interior protocol to communicate with interior nodes, and an exterior protocol to communicate with other edge nodes of different LANs. Further, at any time an ad hoc protocol could be set up which is neither a standard interior nor exterior protocol.

In FIG. 6A, LAN 510 and LAN 530 are both using CSPF as an interior protocol, while LAN 520 utilizes EIGRP as an interior protocol. All edge nodes of each of the LANs 510, 520,530 are connected to a WAN utilizing BGP to communicate between edge nodes.

The exemplary path between node 513 and node 533 includes node 515, edge node 518, edge node 522, node 521, node 523, node 525, edge node 528, edge node 534, and node 531. Further, because a particular protocol was not selected and propagated by the transmitting node, this connection utilizes CSPF for internal communications within LAN 510 and LAN 530, EIGRP for internal communications within LAN 520, and BGP for external communications between edge nodes. At one or both end nodes, the VDR software can analyze this information and determine whether the combination of protocols along this path is satisfactory for the communicating application. It will be appreciated that the VDR software can further analyze the information gathered and determine whether the path meets application requirements for throughput, timing, security, and other important criteria.

In a static environment, this path may represent a connection that meets application requirements and thus no further adjustment would be needed. However, if a network outage were to occur, a network or a node were to move, or another dynamic event was to occur, the path could need to be altered.

Figure 6B:
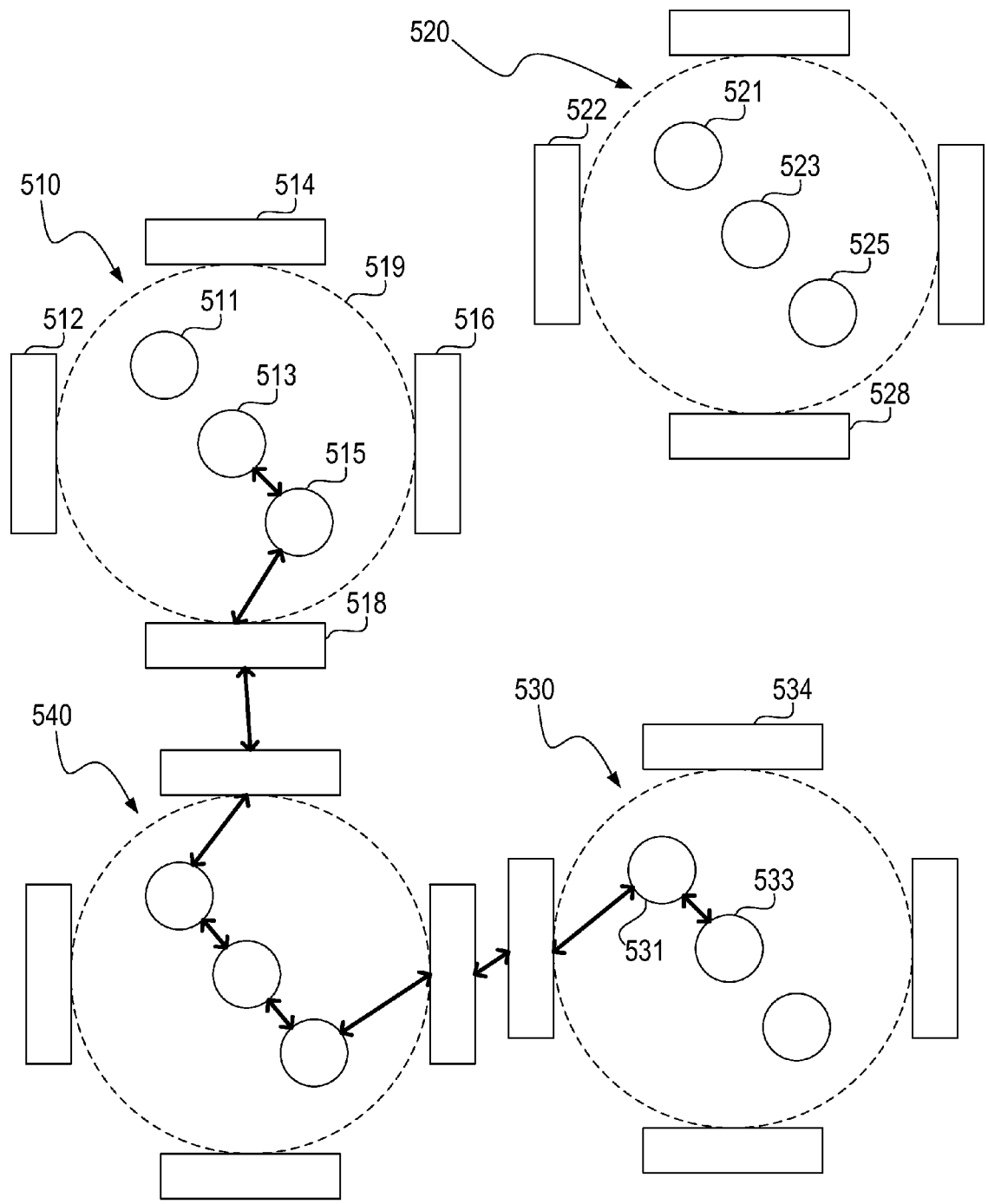

For example, if LAN 520 were to move out of range, node 533 might analyze the path information appended to a packet received after the movement and determine that increased latency resulting from this movement rendered this path unsuitable per application requirements. Node 533 would then attempt to establish a new connection utilizing a different route that would satisfy application requirements. FIG. 6B illustrates such a new connection, which remains between node 513 and node 533, but rather than being routed through LAN 520 as with the path illustrated in FIG. 6A, the path is instead routed through LAN 540.

It will be appreciated that the ability to influence path selection based on client application needs significantly enhances the performance, flexibility, and security of the network.

It will further be appreciated from the above description that one or more aspects of the present invention are contemplated for use with end, client, or end-client devices. A personal or laptop computer are examples of such a device, but a mobile communications device, such as a mobile phone, or a video game console are also examples of such a device. Still further, it will be appreciated that one or more aspects of the present invention are contemplated for use with financial transactions, as the increased security that can be provided by VDR is advantageous to these transactions.

Network Data Transfer

It will be appreciated that the transmission of data over the Internet, or one or more similar networks, often utilizes precious server processing, memory, and bandwidth, as the data is often delivered from, or processed at, a server. In implementations in accordance with one or more preferred embodiments of the present invention, some of this server load is mitigated by use of a direct connection between two end-user devices, such as, for example two end-user devices having virtualized routing capabilities as described hereinabove. Preferably, packets are then routed between the two end-user devices without passing through a conventional server.

Figure 8:
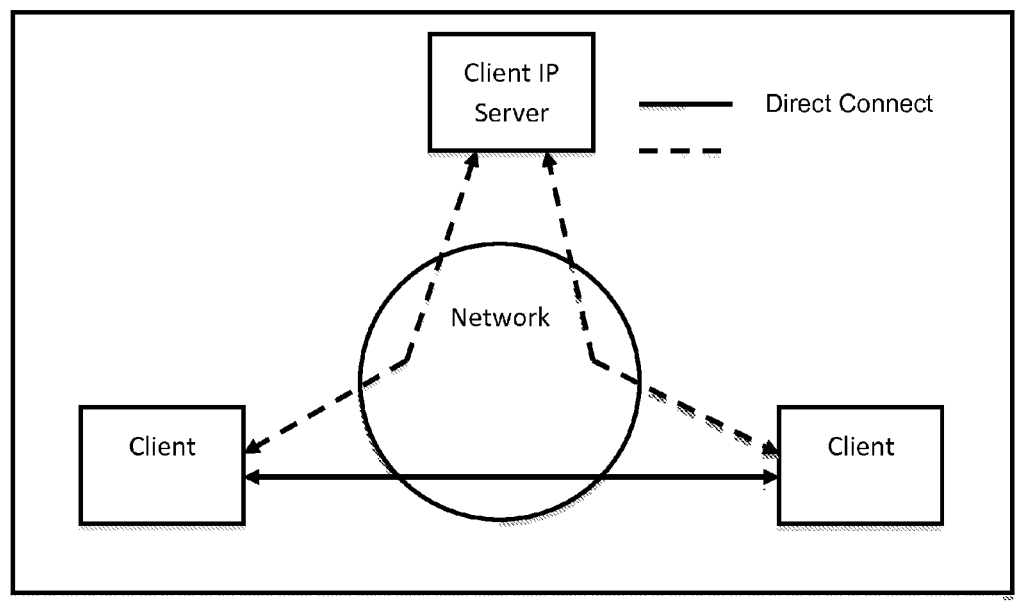
FIG. 8 illustrates a direct connection between two clients in accordance with one or more preferred implementations.

Notably, however, although transferred data packets do not pass through a server, a server may still be utilized to establish, monitor, and control a connection, as illustrated in FIG. 8. Specifically, FIG. 8 illustrates two clients and an IP server which determines that the clients are authorized to communicate with one another, and which passes connection information to the clients that is utilized to establish a direct connection between the clients. Importantly, the IP server is not involved in this direct connection, i.e. data transferred via this direct connection is not routed through or processed by the IP server, which would require the use of additional resources of the IP server.

It will be appreciated that, in some networks, a firewall may be setup to prevent an end-user device from accepting connections from incoming requests. There are three basic scenarios that can occur. In a first case, there is no firewall obstruction. In the first case, either client can initiate the connection for the direct connect. In a second case, a single client has a firewall obstructing the connection. In this case, the client that is obstructed from accepting the connection is instructed by the IP Server to initiate the connection to the client that is unobstructed by the firewall. In a third case, both clients have firewalls obstructing the connection. In this case, a software router, or software switch, is used to accept the connection of the two clients and pass the packets through to the clients directly. Notably, this software router truly acts as a switch, and does not modify the payload as it passes the packet through. In a preferred implementation, a software router is implemented utilizing field programmable gate arrays (FPGAs) or other specific hardware designed to implement such cross-connect functionality.

A preferred system for such a described direct connection includes one or more end-user devices having client software loaded thereon, an IP server, or control server, having server software loaded thereon, and one or more networks (such as, for example Internet, Intranet or Extranet supported by Ethernet, Mobile Phone data networks, e.g. CDMA, WiMAX, GSM, WCDMA and others, wireless networks, e.g. Bluetooth, WiFi, and other wireless data networks) for communication.

In a preferred implementation, client software installed at an end-user device is configured to communicate with an IP server, which associates, for example in a database, the IP address of the end-user device with a unique identification of a user, such as an email address, telephone number, or other unique identification. The client then periodically "checks in" with the IP server and conveys its IP address to the server, for example by providing its IP address together with the unique identification of the user. This checking in occurs when the client is "turned on", e.g. when the end-user device is turned on or when the client software is loaded, as well as when the IP address has changed, or upon the occurrence of any other network event that would change the path between the client and server, or in accordance with other configured or determined events, times, or timelines, which may be user-configurable.

By collecting, and updating, the current IP address of a user, other users may communicate with that user as the user moves from place to place. The IP server thus acts as a registry providing updated IP addresses associated with users. This capability also enables multiple device delivery of content to multiple end-user devices a user designates or owns.

Preferably, such functionality is utilized in combination with virtualized routing capability as described hereinabove. Specifically, it will be appreciated that, currently, Internet communications utilize sessions, and that upon being dropped, e.g. due to a lost connection, a new session must be initialized.

In a preferred implementation, however, rather than having to re-initiate a new session, for example upon obtaining a new IP address, a new session is created and data is transferred from the old session to the new session while maintaining the state of the old session. In this way, a near-seamless transition is presented to a user between an old session and a new session. For example, a user might be connected via their mobile device to a Wi-Fi connection while they are on the move. They might move out of range of the Wi-Fi connection, but still be in range of a cellular connection. Rather than simply dropping their session, a new session is preferably created, and data from the old session copied over, together with the state of the old session. In this way, although the end-user device is now connected via a cellular connection, rather than via a Wi-Fi connection, the user's experience was not interrupted.

One Client to One Client—File Transfer Implementation

In a preferred implementation, direct connections between end-user devices having virtualized routing capabilities are utilized in a file transfer context, such as, for example, with a file sharing application.

Figure 9A:
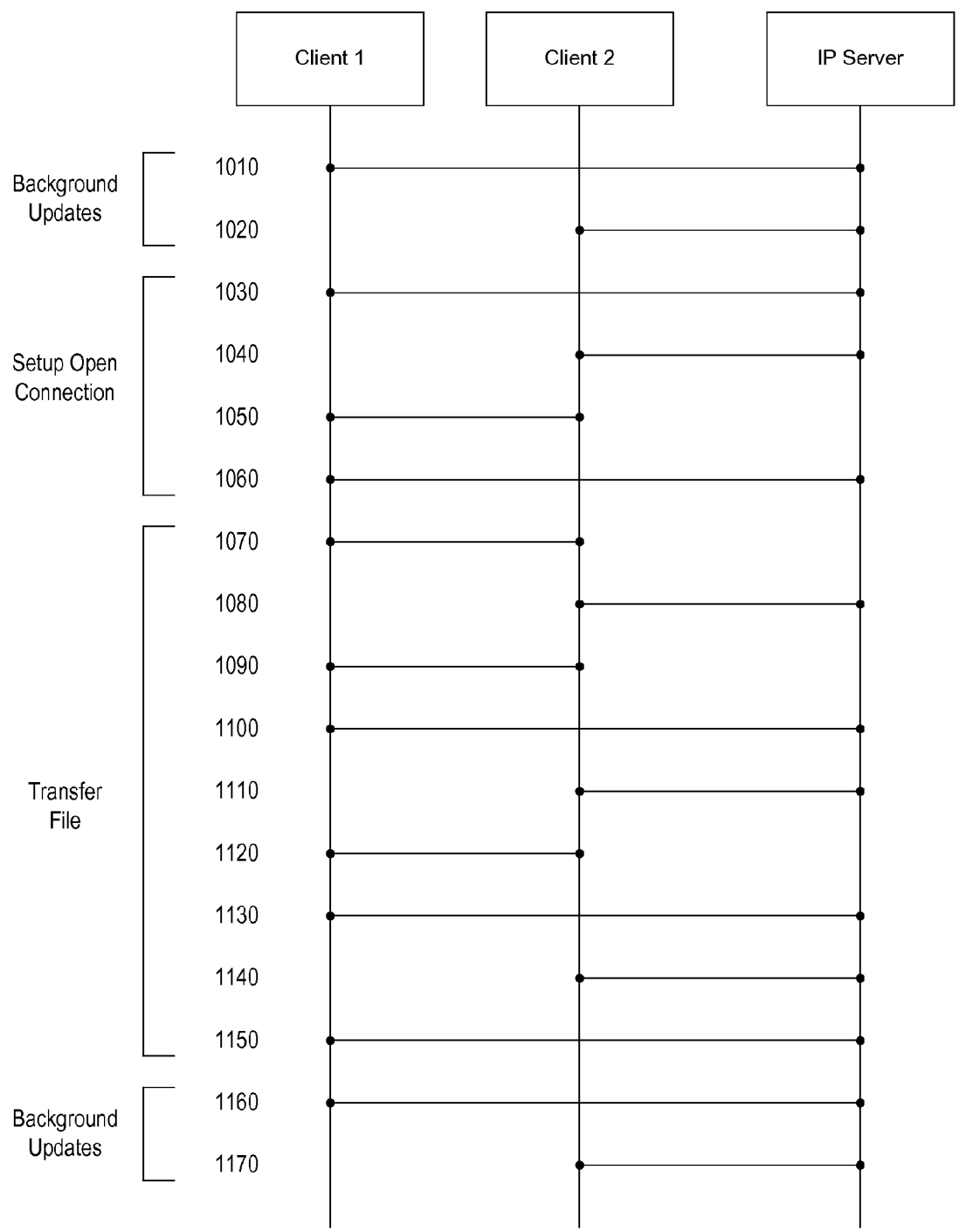
FIG. 9A illustrates an exemplary process for direct transfer of a file from a first client to a second client in accordance with one or more preferred implementations.

FIG. 9A illustrates an exemplary file transfer use scenario between two clients. As described above, each client is in communication with an IP server, for example to communicate its IP address to the IP server. Such communications are exemplified by steps 1010 and 1020.

In use, a first client communicates to an IP server a request to connect to a particular client, user, or end-user device at step 1030. The IP server, or control server, determines whether or not the other client, user, or end-user device is available, e.g. online, and, if so, looks up the current IP address or other addresses associated with the specified client, user, or end-user device. If the client, user, or end-user device is either not online or has left the network, a connection failure message is sent. If the client, user, or end-user device is online, the IP server will take action based upon a pre-selected preference setting. Preferably, each user may choose to accept connection requests automatically, require a confirmation of acceptance, or require some other authentication information, such as an authentication certificate, in order to accept a connection request. If the connection request is accepted, either automatically or manually, the IP server enables the transfer, e.g. by communicating to a second client that the first client has a file for transfer, as exemplified by step 1040.

Preferably, the IP server notifies each client involved in the transfer of required security levels and protocols, such as, for example, hashing algorithms used to confirm that received packets have not been altered. The IP server also insures that the client software at each end-user device has not been tampered, altered, or hacked.

The clients complete a messaging "handshake", and then begin transfer of a file. More specifically, the second client requests a connection with the first client at step 1050, the first client notifies the IP server of its status, e.g. that it is beginning a transfer, at step 1060, the first client grants the second client's request at step 1070, and the second client notifies the IP server of its status, e.g. that its connection request was accepted, at step 1080. The file transfer begins at step 1090.

Periodically, both clients will update the server on the status of the download, as illustrated by exemplary steps 1100 and 1110. The server will keep track of the file transfer and compare the information received from both clients for completeness and security. Once the file transfer is completed, at step 1120, a status of each client is sent to the IP server at steps 1130 and 1140, and the connection is terminated at step 1150. The clients continue to update their availability with the IP server for future downloads, as illustrated by exemplary steps 1160 and 1170.

It will be appreciated that because one of the problems with the TCP/IP protocol is that significant timing delays can occur between communications, using a virtual machine advantageously allows messages to be sent at the lowest levels of the stack between virtual machines of different clients, thus helping insure that communications are not delayed. Further, the inclusion of local routing capabilities enables each client to setup another communication link, if needed, for example to continue a stalled download. Further still, as preferably both clients include such routing capability, either client can reinitiate a separate communication to the other client, thus helping insure that TCP/IP packet delay timeouts do not draw out the communication.

Additionally, to facilitate more robust transfers, one of the clients can instruct the other to open other TCP/IP connections independent of the server link. For example, a first client may receive an IP address for a second client via the IP server, and the second client could then communicate additional IP addresses to the first client and communicate duplicate packets via connections established with these additional IP addresses, thus increasing the reliability of the link. Additionally, the client could send multiple packets over separate IP addresses to insure a different starting point for transmission, and thus insure unique paths. It will be appreciated that this might advantageously allow for the continuing transfer of packets even if one of the connection paths fails. Notably, each path is closed upon completion of the transmission.

Figure 9B:
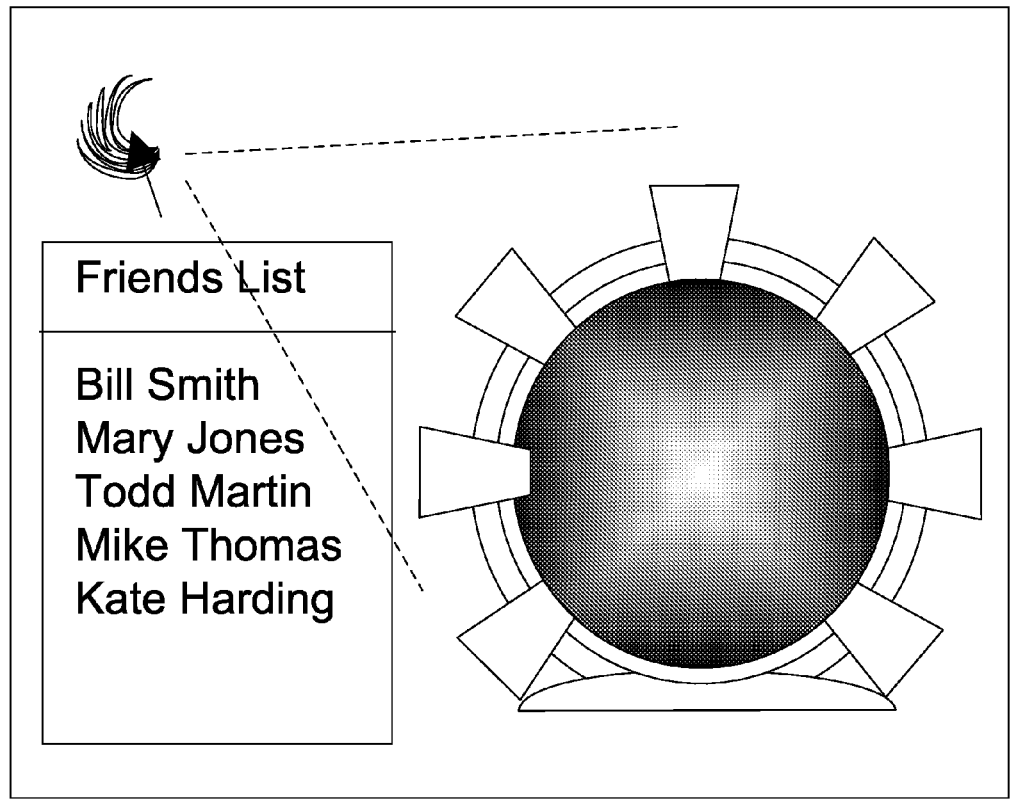
FIG. 9B illustrates an exemplary user interface for a Sharzing file transfer application in accordance with one or more preferred implementations.

FIG. 9B illustrates a user interface for an exemplary file sharing application in accordance with a preferred implementation. To initiate a transfer, a user clicks on an application icon to open the user's Friend's List and a "Sharzing" window. Bold texted names identify on-line contacts, while grey texted names indicate off-line contacts. When the blades of the graphical connection representation on the right side of the window, i.e. the Sharzing, are shut, the Sharzing is inactive. Clicking on an on-line contact opens the blades and establishes a Sharzing connection. The user may then "drag and drop" a file onto the open Sharzing.

Once a Sharzing connection is established, multiple files can be transferred in either direction. Further, multiple Sharzings can be opened simultaneously to different users. Preferably, when a Sharzing is connected, wallpaper of the opposite PC that is being connected to is displayed. As a file is "dragged and dropped" on the Sharzing, the Sharzing displays the progress of the file transfer. Using a a Sharzing skin, a Sharzing depiction can take on identities such as, for example, a futuristic StarGate motif. In the case where such a StarGate motif is used, flash wormhole turbulence may begin when a file is placed in the Sharzing, and, subsequently, an opening at the end of the wormhole may emerge to display an image of the file and/or the recipient's desktop wallpaper. Preferably, when the transferred file is visible on the destination desktop, the transfer is complete.

Many Clients to Many Clients—Video and Audio Conferencing Implementation

In another preferred implementation, direct connections between end-user devices having virtualized routing capabilities are utilized in a telecommunications context, such as, for example, in an audio and video conferencing application.

It will be appreciated that in traditional audio and video conferencing applications, one or more conventional servers act to collate and process audio and video streams from a plurality of clients, and then distribute the processed audio and video streams to the clients. By way of contrast, in a preferred implementation, an end-user device can instead establish a direct connection with another end-user device, and communicate audio and video directly to the other end-user device, rather than communicating through a conventional server. In such implementations, this transmitted audio and video can be directly processed by either a communicating end-user device, a receiving end-user device, or both, rather than by a conventional server.

As described above, via the use of virtualization, a first end-user device can establish a direct connection with not just one other end-user device, but with multiple other end-user devices. The first end-user device provides each other end-user device with its video and audio stream, thus effectively acting as a server by "serving" its video and audio stream to each other end-user device. Each of the other end-user devices involved in a video conference will receive such video and audio streams served by this first end-user device; however, each other end-user device will additionally serve its own video and audio streams. Thus, each end-user device can be characterized as functioning as both a server and a client, possibly at the same time, i.e. as a multiplexed client/server.

Notably, however, although the end-user devices assume some functionality more traditionally assumed by a conventional server in video conferencing applications, a control server is preferably still used to oversee the establishment and maintenance of connections between end-user devices. Unlike in a traditional implementation, however, it is preferred that little to no audio or video processing is handled at this control server, and that the audio and video streams between end-user devices are not routed through the control server.

Instead, the control server primarily provides authentication and security functionality. Preferably, the control server keeps track of a unique identification of each end-user device, software loaded on each end-user device, and an IP address of each end-user device. Additionally, the control server preferably controls which end-user devices can communicate, and at what times they may communicate. For example, the control server preferably provides functionality allowing a moderator to "talk" over every other user at any given time.

Each end-user device preferably continually provides information to the control server, including: a status of the end-user device, whether the end-user device is receiving audio, whether the end-user device has lost its connection, an application status, application data, whether software at the end-user device has been tampered with, a rate of one or more communication links, and a packet error rate of one or more communication links.

Use with Conventional Servers—Media Server Implementation

In some preferred implementations, direct connections between end-user devices having virtualized routing capabilities are utilized in combination with one or more conventional file servers, such as, for example, in a media server application. Specifically, it will be appreciated that the conventional downloading of data, such as a video file, from a server is an intensive process that utilizes precious server processing, memory, and bandwidth. In preferred implementations, some of the strain of this process is offloaded from such a conventional server to one or more end-user devices having virtualized routing capabilities. This architecture decreases the processing, memory requirements and bandwidth loads on a media server. Table 3 of FIG. 10 shows the relationship for a media file that is being downloaded from a server when some of the strain of multiple download requests is transferred off of the media server in accordance with such preferred implementations.

Figure 11:
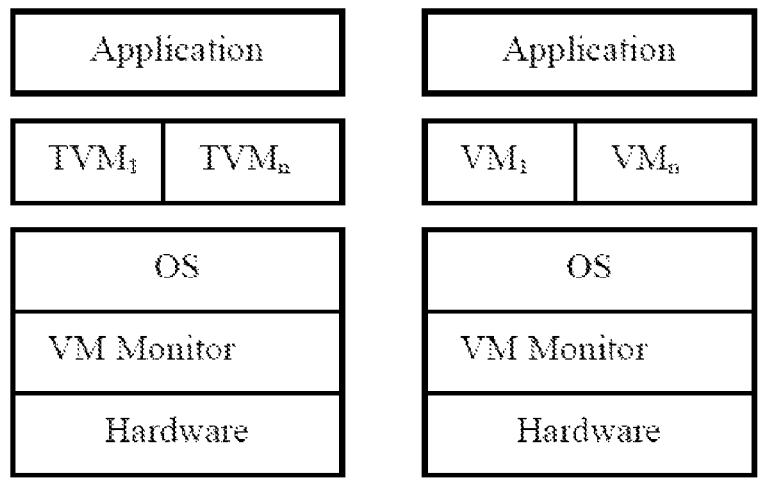
FIG. 11 illustrates client and server architectures in accordance with one or more preferred implementations.

In a preferred implementation, a plurality of end-user devices comprise VDR clients, and a control server comprises a VDR server, each respectively including the architecture illustrated in FIG. 11.

Figure 12:
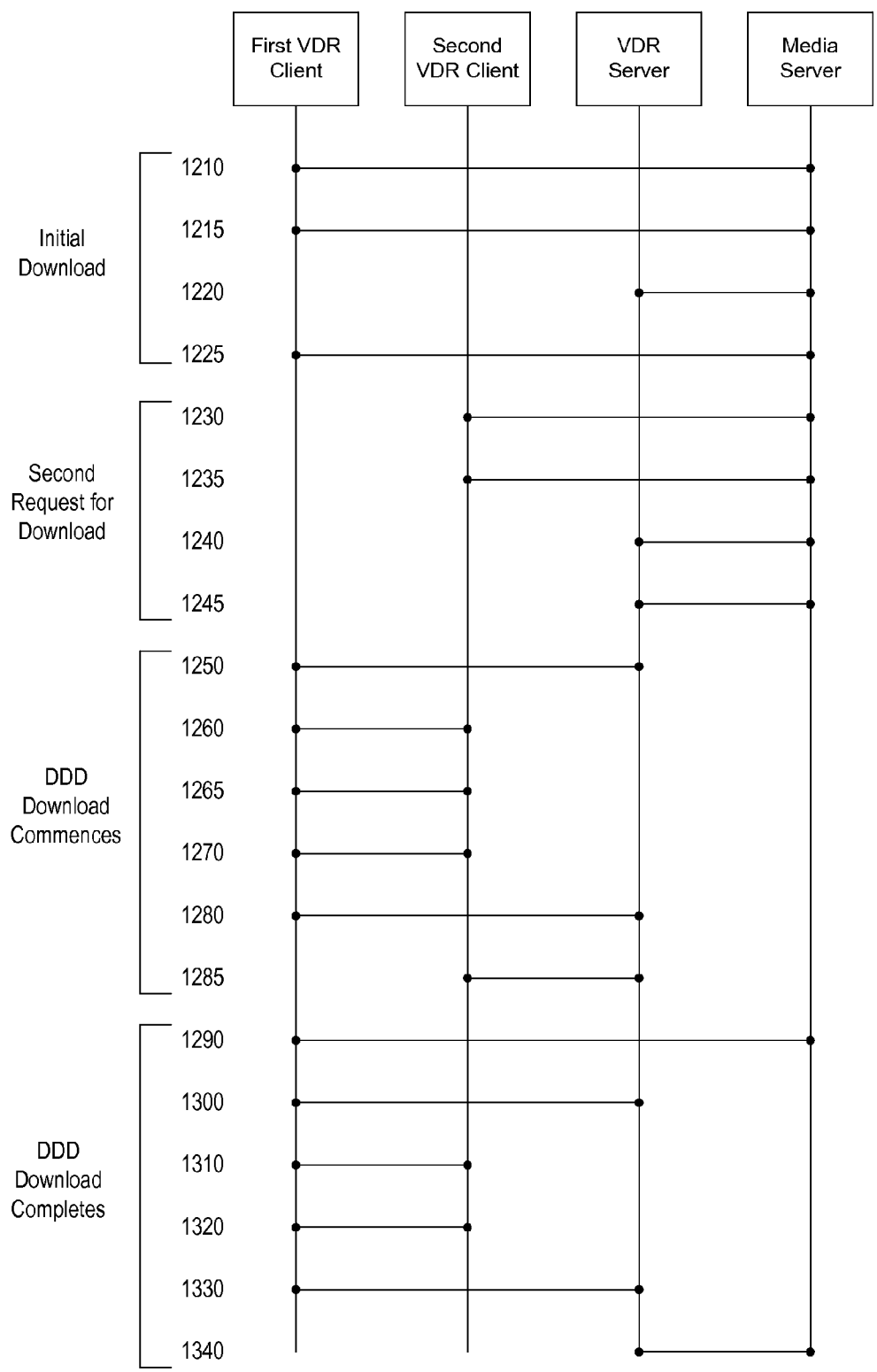
FIGS. 12 and 13 illustrate exemplary processes for downloading of a file in accordance with one or more preferred implementations.

FIG. 12 illustrates an exemplary process for downloading media content to two VDR clients that was originally stored on a customer video server, i.e. a media server. Notably, the process involves not just the two VDR clients and the media server, but also a VDR server as well.

The process begins when the first VDR client requests download of media content from the media server at step 1210, followed by a corresponding TCP/IP handshake at step 1215. Subsequently, the media server alerts the VDR server of the download at step 1220. The VDR records the activity of the first VDR client along with necessary identification and contact information for the first VDR client. The media server follows the typical download procedure and begins the download to the first VDR client at step 1225.

Thereafter, a second VDR client requests the same media content from the media server at step 1230, followed by a corresponding TCP/IP handshake at step 1235. At step 1240, the media server alerts the VDR server to the download request by the second VDR client. The VDR server determines that a VDR client is active, gathers addressing information for the second VDR client, and notifies the media server that it will handle the download at step 1245. Notably, a VDR client is active as long as its connection is active. It will be appreciated that several methodologies may be used to determine how long a client stays active. In at least some implementations, a client is shut down, i.e. rendered inactive, immediately after a file is transferred, which may represent the most efficient use of resources. In a preferred implementation, a timer is utilized, and the client remains active a user-specified number of minutes following activity. Alternatively, a client's connection could be left open until the user wants to close it, or until a network timeout occurs.

At step 1250, the VDR server communicates to the first VDR client and configures it for download capability to the second VDR client, e.g. using the obtained addressing information for the second VDR client. The second VDR client initiates communication with the first VDR client for download of the media content from the first VDR client at step

1260, followed by a corresponding TCP/IP handshake at step 1265, and the download then begins at step 1270.

Notably, the first VDR client, like most clients, has bandwidth available on the uplink when downloading content. It is believed that a typical personal computer, as of the filing date of this application, can handle 3-5 uploads without significant burdening or performance degradation.

Communication between the first and second VDR clients is accomplished between "Thin Virtual Machines" (TVM) of each VDR client. Each TVM is characterized as a "thin" virtual machine, as each preferably generally includes only functionality necessary to support virtualized networking, and, preferably, optimizes the resources needed to support the virtualization of the Network Interface Card (NIC). As will be appreciated from the description hereinabove, each TVM enables each application to have a separate virtual interface to the NIC. This functionality enables customized security capabilities that can be added to each application interface individually.

At steps 1280 and 1285, the VDR clients convey status information, e.g. concerning the download, to the VDR server. At step 1290, the first VDR client completes its download of the media content from the media server. The first VDR client continues the download to the second VDR client, however. While the download continues, status information is sent to the VDR server from each VDR client as exemplified by step 1300. Further, the first and second VDR clients continue to communicate via the virtual machine interface to detect connection issues and reroute packets.

The download continues at step 1310. At step 1320, the second VDR client completes its download, and each VDR client notifies the server of such success, as exemplified by step 1330. The VDR server, in turn, notifies the media server that the download to the second VDR client was completed successfully at step 1340.

If, instead of being completed successfully, the second VDR client's download of the media content had not completed, the second VDR client would have contacted the VDR server for another download opportunity.

Figure 13:
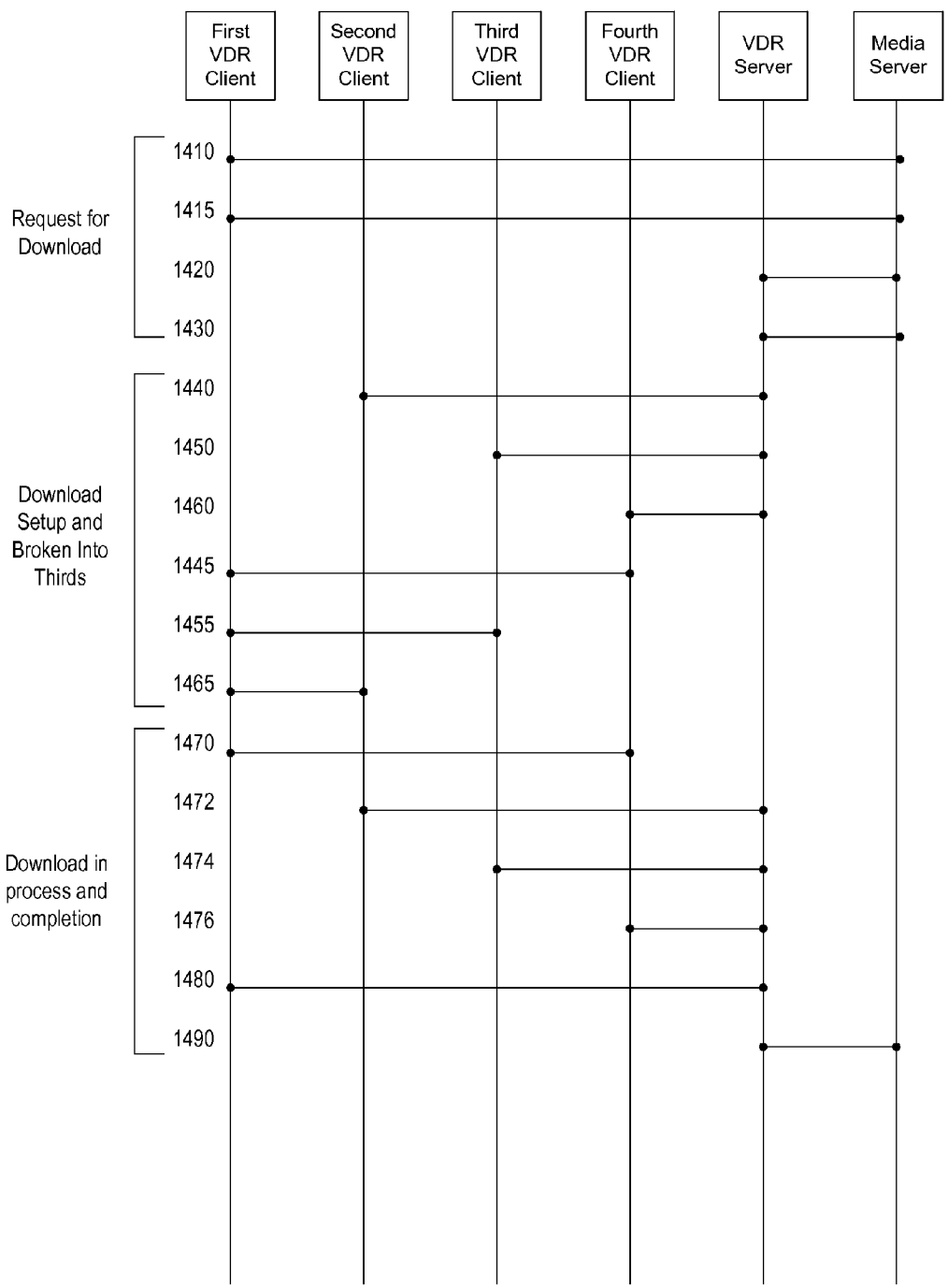

FIG. 13 illustrates another exemplary process where, rather than downloading media content from one other VDR client, media content is downloaded from a plurality of VDR clients, thus increasing the speed of download.

More specifically, a media file is broken into fragments, and each fragment is downloaded to a target VDR client from a different source VDR client using a different connection. In FIG. 13, the process begins when, at step 1410, a first VDR client communicates a download request to a media server, followed by a corresponding TCP/IP handshake at step 1415. At step 1420, the media server alerts the VDR server that a download has been requested. The VDR server determines that multiple VDR clients are available to download the requested media content from, and, at step 1430, the VDR server informs the media server that it will handle the download request. At steps 1440, 1450, and 1460, respectively, the VDR server communicates to second, third, and fourth VDR clients and passes addressing information corresponding to the first VDR client to each. The VDR server assigns each VDR client the portion of the media content that that VDR client will download to the first VDR client.

The first VDR client then downloads, at steps 1445, 1455, and 1465 respectively, the assigned portions of the media content from each of the other VDR clients. As exemplified by illustration of steps 1470, 1472, 1474 and 1476, each VDR client reports to the VDR server status information on any downloads it is a part of, to insure each download is progressing as planned. If a connection is lost, the VDR server can act to correct the problem. Once the first VDR client has completed the download of the media content, it communicates such completion to the VDR server and each other VDR client, as exemplified by illustration of step 1480. Subsequently, the VDR server notifies the media server that the download was completed at step 1490.

MMORPG Implementation

In another preferred implementation, direct connections between end-user devices having virtualized routing capabilities are utilized in a gaming context, such as, for example, in a massively multiplayer online role playing game application.

It will be appreciated that traditional MMORPGs handle the majority of processing for a game world at conventional servers. In a preferred implementation, some of this processing work is offloaded to end-user devices having virtualized routing capabilities. For example, each end-user device preferably functions as a server for serving an avatar associated with a user to other end-user devices whose users are disposed, in the game world, in close proximity. In this way, the processing associated with such avatars is largely offloaded from the server.

This offloading, and other similar offloading, reduces the resources required by an MMORPG server. Notably, however, although the end-user devices assume some functionality more traditionally assumed by a conventional server in MMORPG applications, a control server is preferably still used to oversee the establishment and monitor connections between end-user devices.

The control server preferably provides authentication and security functionality. Preferably, the control server keeps track of a unique identification of each end-user device, software loaded on each end-user device, and an IP address of each end-user device. Additionally, the control server preferably controls what actions each client can take.

Each end-user device preferably continually provides information to the control server, including: a status of the end-user device, whether the end-user device has lost its connection, an application status, application data, whether software at the end-user device has been tampered with, a rate of one or more communication links, a packet error rate of one or more communication links, a game state, a character state, and coordinates of the character's location in the game world.

It will be appreciated that voice conferencing can be an important part of the massive multiplayer experience, and, in accordance with one or more preferred embodiments, functionality and implementation similar to that outlined in an audio conferencing context is utilized in a massively multiplayer gaming context as well.

Notably, in such implementations, a client both receives information from other clients, for example in the form of avatar information, and additionally receives information from a content server, which may also comprise control server functionality.

Security

Preferably, in secure implementations, clients at end-user devices are alerted by a control server of an impending transfer and utilize a secure protocol such as public key encryption, AES (Advanced Encryption Standard), or SSL (Secure Socket Layer). Packets to be transferred are preferably intercepted by a virtual machine of a first client, prior to being sent to the network interface of that client, and encrypted. Following receipt, the packets coming out of the network interface are then intercepted by a virtual machine of the other client and decrypted.

Preferably, strong security is achieved by employing a single encryption key that is passed between the two end-user devices controlled at layer 2 and 3 of the OSI (Open Source Interface) stack model. Regardless of whether the file is transported via Ethernet, WiFi, mobile phone data networks, or other wired or wireless technologies, the file is protected since it is decrypted at the router level of the destination before the data is passed to the application.

Lastly, although systems, methods, and apparatus are described herein largely in the context of end-user devices having virtualized routing capabilities, it will be appreciated that at least some implementations may be practiced in the absence of such virtualized routing capabilities.

Notably, virtualized routing capabilities, such as, for example, those presented by a VDR client, may be advantageous even in communicating with a client that does not enjoy such capabilities, e.g. a non-VDR client. In a preferred method, a VDR client in communication with a non-VDR client searches incoming packets for viruses or other anomalies, and, if such other anomalies are found, the VDR client can break off communications and re-establish a new connection.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of providing network communications between first and second end-user devices, comprising the steps of:
   (a) communicating, by a first end-user device, a request to a server to engage in communications with a second end-user device;
   (b) communicating, by the server, the request received from the first end-user device to the second end-user device;
   (c) communicating, by the second end-user device, acceptance to the server of the request to engage in communications with the first end-user device;
   (d) communicating information associated with a third device to the first end-user device;
   (e) spawning, at the first end-user device, a first virtual machine instance that runs on the first end-user device and that virtualizes network capabilities of the first end-user device such that a first virtual network connection is provided which provides virtualized network capabilities to an application running on the first end-user device external to the first virtual machine instance;
   (f) selecting, at the first end-user device, a routing protocol from among a plurality of available routing protocols for communicating data using the first virtual network connection;
   (g) spawning, at the third device, a third virtual machine instance that runs on the third device and that virtualizes network capabilities of the third device such that a third virtual network connection is provided;
   (h) establishing network communications between the first end-user device, using the first virtual network connection, and the third device, using the third virtual network connection, using received information associated with the third device;
   (h) communicating information associated with the third device to the second end-user device;
   (i) spawning, at the second end-user device, a second virtual machine instance that runs on the second device and that virtualizes network capabilities of the second device such that a second virtual network connection is provided which provides virtualized network capabilities to an application running on the second end-user device external to the second virtual machine instance;
   (j) using the second virtual network connection of the second end-user device, establishing network communications with the third device using received information associated with the third device, wherein the third device is configured to act as a switch and provide cross-connect functionality between the first virtual network connection of the first end-user device and the second virtual network connection of the second end-user device;
   (k) communicating, from the first end-user device using the first virtual network connection and the selected routing protocol, a plurality of packets to the second device, the method involving, for each packet,
      (i) transmitting, from the first end-user device using the first virtual network connection and the selected routing protocol, the packet for communication to the third device,
      (ii) receiving, at the third virtual machine instance that runs on the third device and that virtualizes network capabilities of the third device, the packet,
      (iii) transmitting, from the third device, the packet for communication to the second end-user device, and
      (iv) receiving, at the second virtual machine instance that runs on the second device and that virtualizes network capabilities of the second device, the packet.

2. The method of claim 1, wherein said step of communicating information associated with the third device to the first end-user device comprises communicating an IP address of the third device.

3. The method of claim 1, wherein said step of communicating information associated with the third device to the second end-user device comprises communicating an IP address of the third device.

4. The method of claim 1, wherein said step of establishing a network connection with the third device using the information associated with the third device comprises selecting an initial node to which to transmit for communication with the third device.

5. The method of claim 4, wherein said step of selecting an initial node comprises selecting an initial node based at least partially on network information stored at the first end-user device.

6. The method of claim 5, wherein the method further includes a step of querying one or more nodes of a network for the network information.

7. The method of claim 6, wherein the method further includes receiving the network information from the one or more nodes and generating a routing table based on the network information.

8. The method of claim 1, wherein the first virtual machine instance is spawned in response to a request for a network connection from an application running on the first end-user device.

9. The method of claim 8, wherein the application is a computer game.

10. The method of claim 1, wherein the first end-user device comprises a computer.

11. The method of claim 1, wherein the first end-user device comprises a mobile phone.

12. The method of claim 1, wherein the first and second end-user devices are the same type of device.

13. The method of claim 12, wherein the plurality of available routing protocols includes the Interior Gateway Routing Protocol (IGRP), the Enhanced Interior Gateway Routing Protocol (EIGRP), the Border Gateway Protocol (BGP), and the Constrained Shortest Path First (CSPF) protocol.

14. The method of claim 1, wherein the third device is an end-user device.

15. The method of claim 1, wherein the third device is a computer.

16. The method of claim 1, wherein the third device is a mobile phone.

17. The method of claim 1, wherein the third device is the same type of device as the first end-user device.

18. A system comprising:
(a) a first end-user device comprising:
  (i) a hardware processor, and
  (ii) one or more network adapters providing network capabilities;
(b) a second end-user device comprising:
  (i) a hardware processor, and
  (ii) one or more network adapters providing network capabilities; and
(c) a server comprising:
  (i) a hardware processor, and
  (ii) one or more network adapters providing network capabilities; and
(d) a third device comprising:
  (i) a hardware processor, and
  (ii) one or more network adapters providing network capabilities;
(e) wherein the first end-user device further includes one or more computer readable media containing computer executable instructions configured to:
  (i) communicate, to the server, a request to engage in communications with the second end-user device,
  (ii) spawn virtual machine instances that run on the first device and provide virtualized network capabilities of the first end-user device to an application running on the first end-user device external to the virtual machine instances,
  (iii) select a routing protocol from among a plurality of available routing protocols for communicating data using a spawned virtual network connection, and
  (iv) use a spawned virtual network connection to establish a first network connection with the third device using received information associated with the third device, and
  (v) communicate, using the first network connection and the selected routing protocol, packets for communication to the third device;
(f) wherein the second end-user device further includes one or more computer readable media containing computer executable instructions configured to:
  (i) communicate, to the server, acceptance of the request to engage in communications with the first end-user device,
  (ii) spawn virtual machine instances that run on the second device and provide virtualized network capabilities of the second end-user device to an application running on the second end-user device external to the virtual machine instances, and
  (iii) using a virtual network connection of the second end-user device, establish a second network connection with the third device using received information associated with the third device;
(g) wherein the server further includes one or more computer readable media containing computer executable instructions configured to:
  (i) communicate, to the second end-user device, a request received from the first end-user device,
  (ii) communicate information associated with a third device to the first end-user device, and
  (iii) communicate information associated with a third device to the second end-user device; and
(h) wherein the third device is configured to act as a switch and provide cross-connect functionality between the first network connection established with the first end-user device and the second network connection established with the second end-user device, and includes one or more computer readable media containing computer executable instructions configured to:
  (i) spawn virtual machine instances that run on the third device and that virtualize network capabilities of the third device;
  (ii) communicate, from the third device using a spawned virtual machine instance, a packet received from the first end-user device over the first network connection to the second device via the second network connection.

19. A method of providing network communications between first and second end-user devices, comprising the steps of:
receiving, at the first end-user device, a request for a network connection from an application running on the first end-user device, which application seeks to communicate with an application running on the second end-user device, and
arranging for communications between the application on the first end-user device and the application on the second end-user device by:
(a) communicating, by the first end-user device, a request to a server to engage in communications with the second end-user device;
(b) communicating, by the server, the request received from the first end-user device to the second end-user device;
(c) communicating, by the second end-user device, acceptance to the server of the request to engage in communications with the first end-user device;
(d) communicating information associated with a third device to the first end-user device;
(e) spawning, at the first end-user device, a first virtual machine instance that runs on the first end-user device and that virtualizes network capabilities of the first end-user device such that a first virtual network connection is provided which provides virtualized network capabilities to an application running on the first end-user device external to the first virtual machine instance;

(f) selecting, at the first end-user device, a routing protocol from among a plurality of available routing protocols for communicating data using the first virtual network connection;

(g) spawning, at the third device, a third virtual machine instance that runs on the third device and that virtualizes network capabilities of the third device such that a third virtual network connection is provided;

(h) establishing network communications between the first end-user device, using the first virtual network connection, and the third device, using the third virtual network connection, using received information associated with the third device;

(h) communicating information associated with the third device to the second end-user device;

(i) spawning, at the second end-user device, a second virtual machine instance that runs on the second device and that virtualizes network capabilities of the second device such that a second virtual network connection is provided which provides virtualized network capabilities to an application running on the second end-user device external to the second virtual machine instance;

(j) using the second virtual network connection of the second end-user device, establishing network communications with the third device using received information associated with the third device, wherein the third device is configured to act as a switch and provide cross-connect functionality between the first virtual network connection of the first end-user device and the second virtual network connection of the second end-user device;

(k) communicating, from the first end-user device using the first virtual network connection and the selected routing protocol, a plurality of packets to the second device, the method involving, for each packet,
 (i) transmitting, from the first end-user device using the first virtual network connection and the selected routing protocol, the packet for communication to the third device,
 (ii) receiving, at the third virtual machine instance that runs on the third device and that virtualizes network capabilities of the third device, the packet,
 (iii) transmitting, from the third device, the packet for communication to the second end-user device, and
 (iv) receiving, at the second virtual machine instance that runs on the second device and that virtualizes network capabilities of the second device, the packet.

* * * * *